US011140045B2

(12) United States Patent
Fong et al.

(10) Patent No.: US 11,140,045 B2
(45) Date of Patent: Oct. 5, 2021

(54) CHANGELOG TRANSFORMATION AND CORRELATION IN A MULTI-TENANT CLOUD SERVICE

(71) Applicant: Microsoft Technology Licensing, LLC, Redmond, WA (US)

(72) Inventors: Eddie W. M. Fong, Bellevue, WA (US); Nagaraju Palla, Bothell, WA (US); Ricardo Soares Stern, Redmond, WA (US); Rajmohan Rajagopalan, Bothell, WA (US); Bhavin J. Shah, Bothell, WA (US); Narendra Babu Alagiriswamy, Bothell, WA (US); Karan Singh Rekhi, Sammamish, WA (US); Parikshit Patidar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1015 days.

(21) Appl. No.: 14/815,799

(22) Filed: Jul. 31, 2015

(65) Prior Publication Data

US 2017/0034010 A1   Feb. 2, 2017

(51) Int. Cl.
*G06F 15/173* (2006.01)
*H04L 12/24* (2006.01)
(Continued)

(52) U.S. Cl.
CPC ............ *H04L 41/20* (2013.01); *G06F 9/5072* (2013.01); *H04L 67/10* (2013.01)

(58) Field of Classification Search
CPC ........ H04L 41/20; H04L 67/10; G06F 9/5072
(Continued)

(56) References Cited

U.S. PATENT DOCUMENTS 8,473,484 B2   6/2013   Egan et al.
8,612,599 B2   12/2013  Tung et al.
(Continued)

FOREIGN PATENT DOCUMENTS

CN   102511041 A   6/2012
CN   102779087 A   11/2012
(Continued)

OTHER PUBLICATIONS

Web article: "Amazon EC2 Maintenance Help Page", published by Amazon, 2015 [online][retrieved on Jul. 28, 2015] available at: http://aws.amazon.com/maintenance-help/ , 6 pps.
(Continued)

*Primary Examiner* — Hannah S Wang
(74) *Attorney, Agent, or Firm* — Michael Best & Friedrich LLP

(57) ABSTRACT

Technologies are described herein for changelog transformation and correlation in a multi-tenant cloud service. Components within the multi-tenant cloud service generate changelogs that describe changes made to hardware or software components within the multi-tenant cloud service. The changelogs are received and transformed from different schemas into a common schema. A central change management service ("CCMS") exposes a network service application programming interface ("API"), or other type of interface, through which other network services can obtain the changelogs that have been transformed into the common schema. For example, services can obtain changelogs in order to correlate changes to anomalies or other events taking place in the multi-tenant cloud service, to identify upstream or downstream components that might be impacted by a change, to provide a user interface for viewing the changelogs, the correlation, or the potential
(Continued)

impact of a change, and/or to perform other types of functions.

17 Claims, 10 Drawing Sheets

(51) Int. Cl.
*H04L 29/08* (2006.01)
*G06F 9/50* (2006.01)

(58) Field of Classification Search
USPC ........................................................ 709/223
See application file for complete search history.

(56) References Cited

U.S. PATENT DOCUMENTS

| | | | |
|---|---|---|---|
| 8,745,272 B2 | 6/2014 | Casalaina et al. | |
| 8,769,701 B2 | 7/2014 | Hinton et al. | |
| 8,910,278 B2 | 12/2014 | Davne et al. | |
| 8,924,559 B2 | 12/2014 | Brown et al. | |
| 2007/0088764 A1* | 4/2007 | Yoon ................ | H04L 29/06027 |
| 2008/0195369 A1* | 8/2008 | Duyanovich ....... | G06F 11/0709 |
| | | | 703/22 |
| 2010/0125664 A1 | 5/2010 | Hadar et al. | |
| 2011/0078411 A1* | 3/2011 | Maclinovsky ......... | G06Q 10/06 |
| | | | 712/30 |
| 2012/0179646 A1* | 7/2012 | Hinton .............. | G06F 17/30557 |
| | | | 707/607 |
| 2013/0080349 A1 | 3/2013 | Bhola et al. | |
| 2013/0179560 A1* | 7/2013 | Kumar ................. | G06F 11/302 |
| | | | 709/224 |
| 2013/0198637 A1 | 8/2013 | Childers, Jr. et al. | |
| 2013/0268914 A1 | 10/2013 | Oslake et al. | |
| 2013/0346899 A1 | 12/2013 | Cole et al. | |
| 2014/0006580 A1 | 1/2014 | Raghu | |
| 2014/0019335 A1 | 1/2014 | MacDonald et al. | |
| 2014/0245141 A1 | 8/2014 | Yeh et al. | |
| 2014/0280800 A1 | 9/2014 | Verchere et al. | |
| 2014/0281700 A1 | 9/2014 | Nagesharao et al. | |
| 2014/0336791 A1 | 11/2014 | Asenjo et al. | |
| 2015/0019706 A1 | 1/2015 | Raghunathan et al. | |
| 2015/0020061 A1 | 1/2015 | Ravi | |
| 2015/0180949 A1 | 6/2015 | Maes et al. | |
| 2015/0242486 A1* | 8/2015 | Chari ................... | H04L 67/306 |
| | | | 707/737 |
| 2016/0056993 A1* | 2/2016 | Harishankar ......... | H04L 41/069 |
| | | | 709/224 |

FOREIGN PATENT DOCUMENTS

| | | |
|---|---|---|
| CN | 103329129 A | 9/2013 |
| CN | 103634291 A | 3/2014 |
| CN | 103716372 A | 4/2014 |
| WO | WO2010073259 | 7/2010 |
| WO | WO2014049389 | 4/2014 |
| WO | WO2014058411 A1 | 4/2014 |

OTHER PUBLICATIONS

Bourgeau, P. "Cloud Security: Managing the Cloud with Windows intune" published by Microsoft, copyright 2015 TechNet Magazine [online][retrieved on: Jul. 18, 2015] available at: https://technet.microsoft.com/en-us/magazine/ff742836.aspx, 7 pps.

Web article: "Configuring JIRA Service Desk Notifications", Published by Atlassian, 2015 [online][retrieved on: Jul. 30, 2015] available at: https://confluence.atlassian.com/display/SERVICEDESKCLOUD/Configuring+JIRA+Service+Desk+notifications, 1 page.

Web article: "Frustration-free log management. Get started in seconds." Published by Papertrail [online][retrieved on Jul. 30, 2015] retrieved from: https://papertrailapp.com/ , 6 pages.

Web article: "How Can I Change My Notification Settings?" Published by Egnyte, 2015, [online][retrieved on Jul. 30, 2015] retrieved from: https://helpdesk.egnyte.com/hc/en-us/articles/201637344-How-Can-I-Change-My-Notification-Settings-%23Shared, 10 pages.

Web Article: "HP Helion CloudSystem Enterprise software" published by Hewlett-Packard copyright 2014 [online] [retrieved on Jul. 18, 2015] available at: http://www8.hp.com/h20195/v2/getpdf.aspx/c04229565.pdf?ver=5 , 11 pps.

Web article: Kwa, Kenaz, "Planned Maintenance for Azure Virtual Machines", published by Microsoft, 2015 [online] [retrieved on Jul. 28, 2015] retrieved from https://azure.microsoft.com/en-in/documentation/articles/virtual-machines-planned-maintenance/, 5 pps.

Web article: "Chapter 11. Maintenance, Failures and Debugging" published by openstack, 2015 [online][retrieved on Jul. 28, 2015] retrieved from: http://docs.openstack.org/openstack-ops/content/maintenance.html, 16 pps.

Web article: "NU Cloud Terms of Service" published by Northwestern University, 2015 [online][retrieved on Jul. 28, 2015] retrieved from: http://www.it.northwestern.edu/bin/docs/NUCioud-Terms-of-Service.pdf , 5 pages.

Web article: "The Top 6 Ways Cloud-Based Monitoring Benefits End Users and Resellers" Published by DVTEL copyright 2013 [online] [retrieved on Jul. 18, .2015] retrieved from: http://www.dvtel.com/the-top-6-ways-cloud-based-monitoring-benefits-end-users-and-resellers/ , 5 pps.

"International Search Report and Written Opinion Issued in PCT Application No. PCT/US2016/044134", dated Oct. 31, 2016, 11 Pages.

"First Office Action and Search Report Issued in Chinese Patent Application No. 201680044961.X", dated Mar. 19, 2021, 14 Pages.

"Office Action Issued in European Patent Application No. 16747969.0", dated Jul. 7, 2020, 11 Pages.

"Summons to Attend Oral Proceedings issued in European Patent Application No. 16747969.0", dated Mar. 22, 2021, 13 Pages.

* cited by examiner

CHANGELOG TRANSFORMATION AND CORRELATION IN A MULTI-TENANT CLOUD SERVICE

BACKGROUND

A hosted application is a software application where the software resides on servers that are accessed through a wide-area network, such as the Internet, rather than more traditional on-premise software that is installed on a local server computer or on individual client computers. Hosted applications might also be known as Internet applications, application service providers ("ASPs"), World Wide Web ("Web")-based applications, software as a service ("SAAS"), or on-line applications. Hosted applications typically provide services over a network, commonly referred to as a "cloud", and are often used concurrently by multiple customers called "tenants." Consequently, such applications are referred to herein as "multi-tenant cloud services."

Multi-tenant cloud services currently exist for providing electronic mail ("email") services, calendaring services, task management services, communications services, file storage services, customer relationship management ("CRM") services, and many others. Large scale multi-tenant cloud services such as these are commonly implemented using many thousands, or even tens of thousands, of server computers operating in one or more geographically disparate data centers. A large number of network services execute on the server computers to implement the multi-tenant cloud service. Additionally, such multi-tenant cloud services commonly require significant networking infrastructure (e.g. thousands of routers, switches, load balancers, etc.) in order to enable data communication between the servers and the network services that are executing thereupon.

During operation of a large scale multi-tenant cloud service, such as those described above, it is commonly necessary to make changes to the hardware (e.g. servers or networking components) and the software (e.g. operating system updates, updates to the multi-tenant cloud service code, configuration changes, etc.) used to provide the service. These changes can impact the operation of the service, sometimes in unpredictable ways. For example, and without limitation, an update to the operating system on a server computer might render that server computer unable to process requests from clients of the service. Such changes can also impact the operation of upstream or downstream components, sometimes also in unpredictable ways. As a result, it can be difficult for an engineer to determine the source of an anomaly following a change to a software or hardware component in a large scale multi-tenant cloud service, such as those described above, that utilizes many thousands of servers, networking components, and software components.

It is with respect to these and other considerations that the disclosure made herein is presented.

SUMMARY

Technologies are described herein for changelog transformation and correlation in a multi-tenant cloud service. Through an implementation of the technologies disclosed herein, changelogs can be collected from services executing in conjunction with the provision of a multi-tenant cloud service that describe changes made to hardware or software components used to provide the multi-tenant cloud service. The changelogs can then be transformed and utilized to correlate changes made to components within the multi-tenant cloud service with anomalies or other events taking place in the multi-tenant cloud service. The changelogs can also be utilized to identify components in the multi-tenant cloud service that might be impacted by a change. A user interface ("UI") can also be generated for viewing the changelogs, the correlation between changes and anomalies or other events, and/or the components potentially or actually impacted by a change. The data presented in the UI can be provided on a per-tenant basis so that each tenant can have insight into changes to components within the multi-tenant cloud service that might impact the availability of the multi-tenant cloud service to each tenant's users.

According to one configuration disclosed herein, various network services execute in conjunction with the provision of a multi-tenant cloud service. The network services are configured to generate changelogs that describe changes to components used to provide the multi-tenant cloud service. For example, and without limitation, services utilized to provide the multi-tenant cloud service can emit changelogs. Additionally, an orchestration service that provides functionality for managing, deploying and/or modifying components that provide the multi-tenant cloud service can also emit changelogs describing aspects of its operation.

The changelogs can describe changes made to hardware or software components used to provide the multi-tenant cloud service, can describe changes to the configuration of hardware or software components, or can describe other types of changes made to components utilize to provide the multi-tenant cloud service. The changelogs can include, for example, data identifying the time a change started and ended, an identifier ("ID") for a changed component, and properties associated with the change. The changelogs provided by the various services can be expressed using different schemas.

In one configuration, a changelog transformation service also executes in conjunction with the multi-tenant cloud service that receives the changelogs from the various services and transforms the changelogs into a common schema. The changelog transformation service can also assign a unique ID to each changelog. The changelogs in the common schema can then be stored in a central changelog repository. The changelog transformation service can store the changelogs in the central changelog repository directly or can provide the changelogs directly to a central change management service ("CCMS") for storage in the central changelog repository.

The CCMS is a network service that also executes in conjunction with the provision of the multi-tenant cloud service. The CCMS is configured to expose a network service application programming interface ("API") through which other services can obtain the changelogs. For example, and without limitation, other services executing in the multi-tenant cloud service can call the API to search, filter, sort, and perform other operations on the changelogs on a per-tenant basis. Moreover, other services can call the API to obtain changelogs corresponding to changes that are pertinent to a particular tenant of the multi-tenant cloud service. For example, and without limitation, the API can be utilized to obtain changelogs that correspond only to changes made to components utilized to provide the multi-tenant cloud service to a particular tenant. In order to provide this functionality, the CCMS can have access to mapping data that describes various types of relationships between tenants and hardware and software components utilized to provide the multi-tenant cloud service such as, but not limited to, data describing the dependencies between various components used to provide the multi-tenant cloud service and data that identifies the components utilized to provide the multi-tenant cloud service to each of its tenants.

In one configuration, a correlation service also executes in conjunction with the provision of the multi-tenant cloud service that is configured to correlate changelogs with anomalies or other events occurring in the multi-tenant cloud service. In order to provide this functionality, the correlation service can utilize anomaly data describing an anomaly along with the mapping data and changelogs obtained from the CCMS in order to identify the correlation between an anomaly and a changelog. In one configuration, the correlation service operates in conjunction with a visualization service that can provide a suitable user interface ("UI") through which a tenant can view data identifying the correlation between a changelog and an anomaly potentially or actually impacting the tenant. Other types of correlations can also be performed.

The changelogs and the mapping data described above can also be utilized to determine the scope of impact of a change. For example, and without limitation, the mapping data described above can be utilized to identify components in a multi-tenant cloud service that can be impacted by a change described by one of the changelogs. Data identifying the components in the multi-tenant cloud service that are associated with a tenant and that can be impacted by a change can then be identified in the UI described above.

In a similar fashion, the changelogs and the mapping data can also be utilized to identify a change described by a changelog that might have caused an anomaly that impacted one or more components in the multi-tenant cloud service that are associated with a particular tenant. In this example, the change that might have impacted the tenant can also be identified in the UI mentioned above. In this way, a single tenant of the multi-tenant cloud service can be provided with data showing tenant-specific components that can be impacted by a change and/or the changes that can impact components used to provide the multi-tenant cloud service to the tenant. The CCMS and the other services described above and in further detail below can also provide other types of data relating to changes made in the multi-tenant cloud service on a per-tenant basis.

It should be appreciated that the above-described subject matter can be implemented as a computer-controlled apparatus, a computer process, a computing system, or as an article of manufacture such as a computer readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for changelog transformation and correlation a multi-tenant cloud service. Through an implementation of the technologies disclosed herein, a central changelog repository can be created and maintained that contains changelogs that described changes made to software and hardware components used to provide a multi-tenant cloud service. The changelogs can be transformed and the changes described by the changelogs can be correlated with anomalies or other events taking place in the multi-tenant cloud service, used to identify components upstream or downstream from a changed component that might be impacted by a change, and/or to provide other types of insight on a per-tenant basis into the impact of changes made to components used to provide the multi-tenant cloud service.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

Figure 1A:
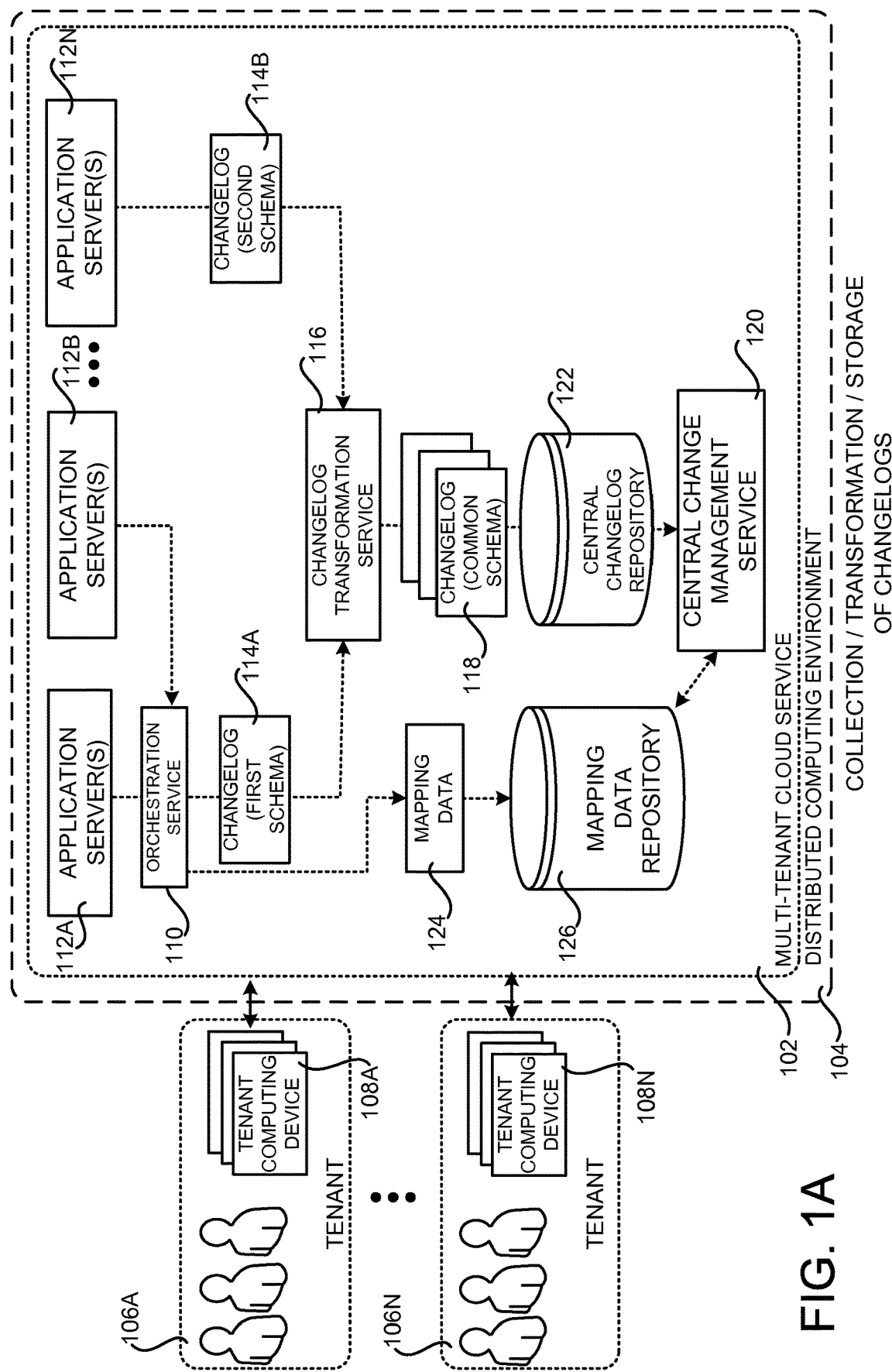
FIG. 1A is a computer system architecture diagram showing aspects of the operation of a central change management service that is utilized in implementations disclosed herein to provide central change management for a multi-tenant cloud service.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for providing central change management for a multi-tenant cloud service will be described. In particular, FIG. 1A is a computer system architecture diagram showing aspects of the operation of a central change management service 120 (which might be referred to herein as the "CCMS 120") that is utilized in implementations disclosed herein to provide central change management for a multi-tenant cloud service 102. As shown in FIG. 1A, the CCMS 120 is executed in conjunction with the provision of a multi-tenant cloud service 102 in one particular configuration. The multi-tenant cloud service 102 is executed in a distributed computing environment 104 in one particular implementation. The distributed computing environment 104 includes a computing environment operating on, in communication with, or as part of one or more networks (not shown in FIG. 1A).

As discussed briefly above, the multi-tenant cloud service 102 is a software application where the software resides on server computers that are accessed through a wide-area network, such as the Internet, rather than more traditional on-premise software that is installed on a local server computer or on individual client computers. As also mentioned above, multi-tenant cloud services currently exist for providing email services, calendaring services, task management services, communications services, file storage services, CRM services, and many others.

The multi-tenant cloud service 102 can be used concurrently by multiple customers, which are illustrated in FIG. 1A as tenants 106A-106N (which might be referred to herein individually as a "tenant 106" or collectively as the "tenants 106"). The tenants 106A-106N can utilize one or more tenant computing devices 108A-108N, respectively, to communicate with the distributed computing environment 104 and utilize or manage the functionality provided by the multi-tenant cloud service 102. The tenant computing devices 108 can connect to the multi-tenant cloud service 102 via a network (not shown in FIG. 1A), such as the Internet. The tenant computing devices 108 can be laptop computers, a desktop computers, "slate" or tablet computing devices, smartphones, video game consoles, or other types of mobile computing devices, or virtually any other type of computing device.

As discussed briefly above, large scale multi-tenant cloud services such as the multi-tenant cloud service 102 shown in FIG. 1A are commonly implemented using many thousands, or even tens of thousands, of server computers (shown in FIG. 1A as the application servers 112A-112N) operating in one or more geographically disparate data centers (not shown in FIG. 1A). A number of network services can execute on the application servers 112A-112N to implement the functionality provided by the multi-tenant cloud service 102. Some of the application servers 112 and network services might be utilized to provide capacity (e.g. storage capacity or another type of capacity) for the multi-tenant cloud service 102, while other application servers 112 and network services are utilized to perform management functions The multi-tenant cloud service 102 shown in FIG. 1A can also utilize a networking infrastructure (not shown in FIG. 1A), that can include routers, switches, load balancers, and other types of networking components, in order to enable data communication between the application servers 112A-112N, the network services, and the tenant computing devices 108. Additional details regarding the configuration and utilization of the distributed computing environment 104 will be provided below with reference to FIG. 8.

As also discussed briefly above, it can be necessary to make changes to the hardware (e.g. application servers 112A-112N or networking components) and the software (e.g. operating system updates, updates to the multi-tenant cloud service code, configuration changes, etc.) used to provide the multi-tenant cloud service 102. These changes can impact the operation of the multi-tenant cloud service 102, sometimes in unpredictable ways. For example, and without limitation, an update to the operating system on one of the application servers 112A-112N might render that application server unable to process requests from clients of the service, such as the tenant computing devices 108. Such changes can also impact the operation of components upstream or downstream from a changed component, such as other application servers 112, for example, sometimes also in unpredictable ways. As a result, it can be difficult for an engineer to determine the source of an anomaly following a change to a software or hardware component operating in a multi-tenant cloud service 102, such as those described above, that utilizes many thousands of servers, networking components, and software components.

In order to address the considerations set forth above, and potentially others, components within the multi-tenant cloud service 102 are configured to generate changelogs 114A-114B (which might be referred to herein as the "changelogs 114" or a "changelog 114") that describe changes that have been made, or that will be made, to components used to provide the multi-tenant cloud service 102. For example, and without limitation, the changelogs 114 can describe changes made to hardware or software components used to provide the multi-tenant cloud service 102, can describe changes to the configuration of hardware or software components, or can describe other types of changes made to components utilize to provide the multi-tenant cloud service 102. The changes described by the changelogs can be made by engineers employed by the provider of the multi-tenant cloud service 102, by the tenants 106, and/or by other third-parties not specifically shown in the FIGS.

Changelogs 114 can also be provided by third parties in some configurations. For example, a networking internet provider for a tenant 106 might provide changelogs 114 identifying changes made to the tenant's Internet service. Changes to client applications executing on the tenant computing devices 108 can also generate changelogs 114. In this way, changelogs 114 can be generated describing changes made to components in the distributed computing environment 104, changes made to a network connection between the tenants 106 and the multi-tenant cloud service 102, and the tenant computing devices 108.

Changes to software components operating in conjunction with the multi-tenant cloud service 102 include, but are not limited to, changes caused by the deployment of program code (e.g. rolling out new features, bug fixes, performance fixes, addressing security flaws, etc.), changes to a local or remote software configuration, and the deployment of updates to an operating system or the installation of a new operating system. Changes to hardware components operating in conjunction with the multi-tenant cloud service 102 include, but are not limited to, replacement of failed hardware, upgrading of hardware components, changing a hardware configuration, and adding new hardware. Changes to hardware components also includes the modification, removal, addition or upgrading of the hardware, software or configuration of networking components or networking infrastructure such as, but not limited to, routers, load balancers, switches, and others.

The changes that can be reflected in the changelogs 114 also include state changes. State changes are any change to the state of a hardware or software component used in the multi-tenant cloud service 102 such as, but not limited to, the rebooting of an application server 112 or the restarting of a process executing in conjunction with the execution of a network service. The changelogs 114 might also describe other types of changes to the state of hardware and software components operating in conjunction with the provision of the multi-tenant cloud service 102. In general, therefore, it should be appreciated that the changelogs 114 can be utilized to describe any operation that changes the persistent state of a software or hardware component in the distributed computing environment 104. The changelogs 114 can also be utilized in a similar fashion to describe changes made to other computing devices that consume or otherwise interact with the functionality provided by the multi-tenant cloud service 102, such as the tenant computing devices 108.

As shown in FIG. 1A, an application server 112N can be configured to generate a changelog 114B directly that describes a change that took place at the application server 112N. An orchestration service 110 can also be utilized and also configured to generate a changelog 114A in a similar manner. The orchestration service 110 provides functionality for managing, directing, and performing changes on the application servers 112. For example, and without limitation, the orchestration service 110 can provide functionality for coordinating software updates on the application servers 112, rebooting the application servers 112, and for performing other types of changes on the application servers 112. Although a single instance of the orchestration service 110 is shown in FIG. 1A, multiple instances of this service can be utilized in other configurations. Other types of services might also generate changelogs 114 in other configurations.

As also shown in FIG. 1A, the changelogs 114 can be expressed using various different data schemas. In the example shown in FIG. 1A, for instance, the orchestration service 110 has generated the changelog 114A using a first schema and a network service executing on the application server 112N has generated the changelog 114N using a schema that is different than the first schema. Other network services and/or components in the multi-tenant cloud service 102 might also utilize other different schemas for the changelogs 114.

In one configuration, a changelog transformation service 116 also executes in conjunction with the multi-tenant cloud service 102. The changelog transformation service 116 receives the changelogs 114 from the various network services, such as the orchestration service 110, and transforms the changelogs 114 into changelogs 118 that are expressed using a single common schema. For example, and without limitation, the changelog transformation service 116 can expose a network service API through which changelogs 114 can be submitted for transformation and storage. Transforming the changelogs 114 that have been expressed using different schemas into a changelogs that use a common schema allows queries to be performed across the data contained in all of the changelogs 114 in a common way. Additional details regarding this process will be provided below.

The changelog transformation service 116 can also assign a unique ID to each changelog 118 expressed using the common schema. The unique ID might be utilized, for example, to indicate that a single change was applied to multiple components in the multi-tenant cloud service 102. For example, and with limitation, a single software deployment can be performed that deploys the same program code to multiple application servers 112. In this case, a single changelog 118 might be generated that indicates that the same change was applied to multiple application services 112. The unique ID assigned to the changelogs 118 might also be utilized in other ways in other configurations.

Once transformed, the changelogs 118 in the common schema can be stored in a central changelog repository 122. The changelog transformation service 116 can store the changelogs 118 in the central changelog repository 122 directly or can provide the changelogs to the CCMS 120 for storage in the central changelog repository 122 in some configurations. The central changelog repository 122 is a distributed database service or another type of storage service or location suitable for storing the changelogs 118 in the common schema. Additional details regarding the operation of the changelog transformation service 116 are provided below with regard to FIG. 4.

In some configurations, the changelogs 118 are retained in the central changelog repository 122 for a user-specified period of time. In this way, the change history for a particular component operating in the multi-tenant cloud service 102 can be determined. The change history can be presented in a suitable UI or made available to tenants 106 in other ways according to various configurations.

Figure 2:
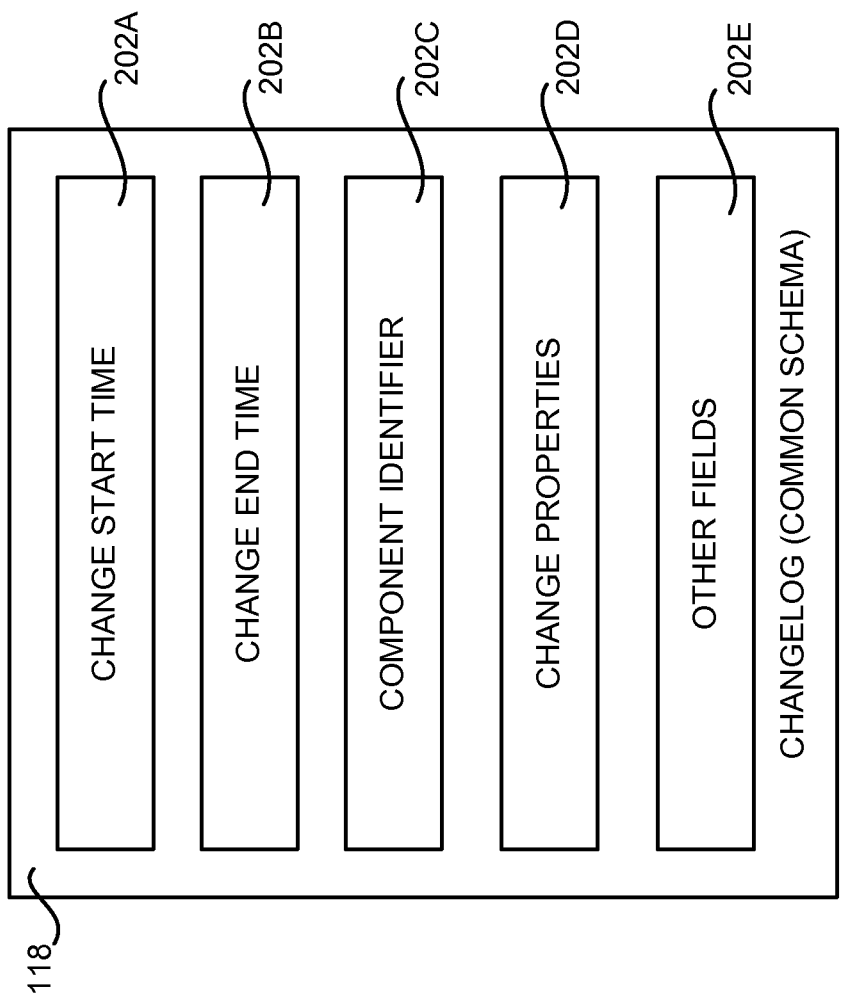
FIG. 2 is a data structure diagram showing one illustrative configuration for a changelog utilized in one configuration disclosed herein.

Referring momentarily to FIG. 2, a data structure diagram showing one illustrative configuration for a changelog 118 utilized in one configuration disclosed herein will be described. As shown in FIG. 2, a changelog 118 can include, for example, a field 202A that stores data identifying the time that an associated change started. Similarly, the changelog 118 can include a field 202B that stores data identifying the time that an associated change ended. For example, and without limitation, the fields 202A and 202B can store data describing the time that a software deployment started and ended, respectively.

A changelog 118 can also include a field 202C that stores a component ID for a changed component. For example, and without limitation, the field 202C might store a component ID that uniquely identifies an application server 112 or a networking device that was changed. The ID stored in the field 202C can also specify an ID for a configuration object (i.e. a container of configuration data that stores settings that can apply to tenants, users, software components, or hardware), a tenant, or a user. A changelog 118 can also include a field 202D that stores data describing properties of a change. For example, and without limitation, if a changelog 118 relates to the deployment of software, the field 202D can store data identifying the version number of the deployed software, any errors encountered during the deployment of the software, information about how the software deployment was performed, and other attributes of the deployment. The changelogs 118 can also include other fields 202E storing other data not specifically described herein in other configurations.

Referring back to FIG. 1A, additional details regarding the operation of the CCMS 120 will be provided. As discussed briefly above, the CCMS 120 is a network service that also executes in conjunction with the provision of the multi-tenant cloud service 120. The CCMS 120 is configured to expose a network service API 128 (shown in FIG. 1B), through which other network services within or potentially external to the multi-tenant cloud service 102 can obtain and perform various operations on the changelogs 118 in the common schema. For example, and without limitation, other network services executing in the multi-tenant cloud service 102 can call the API 128 to search, filter, sort, and perform other operations on the changelogs 118 on a per-tenant basis.

Other network services can also call the API 128 exposed by the CCMS 120 to obtain changelogs 118 corresponding to changes that are pertinent to a particular tenant 106 of the multi-tenant cloud service 102. For example, and without limitation, the API 128 can be utilized to obtain changelogs 118 that correspond only to changes made to components utilized to provide the multi-tenant cloud service 102 to a particular tenant 106. In order to provide this functionality, the CCMS 120 can also have access to a mapping data repository 126 storing mapping data 124. The mapping data 124 describes various types of relationships between hardware and software components utilized to provide the multi-tenant cloud service 102.

The mapping data 124 might include, for instance, data describing the logical or physical relationships between various software and hardware components used to provide the multi-tenant cloud service 102. For example, and without limitation, the mapping data 124 might specify the application servers 112 that are served by a load balancer. The mapping data 124 can also include data that maps software and hardware components in the multi-tenant cloud service 102 to the tenants 106. For instance, the mapping data 124 might specify the tenants 106 that are served by a particular application server 112 or other type of hardware or software component. In this regard it should be appreciated that the same software and hardware components can serve multiple tenants 106 simultaneously. Additional details regarding the operation of the CCMS 120 are provided below with regard to FIGS. 1B and 3.

Figure 1B:
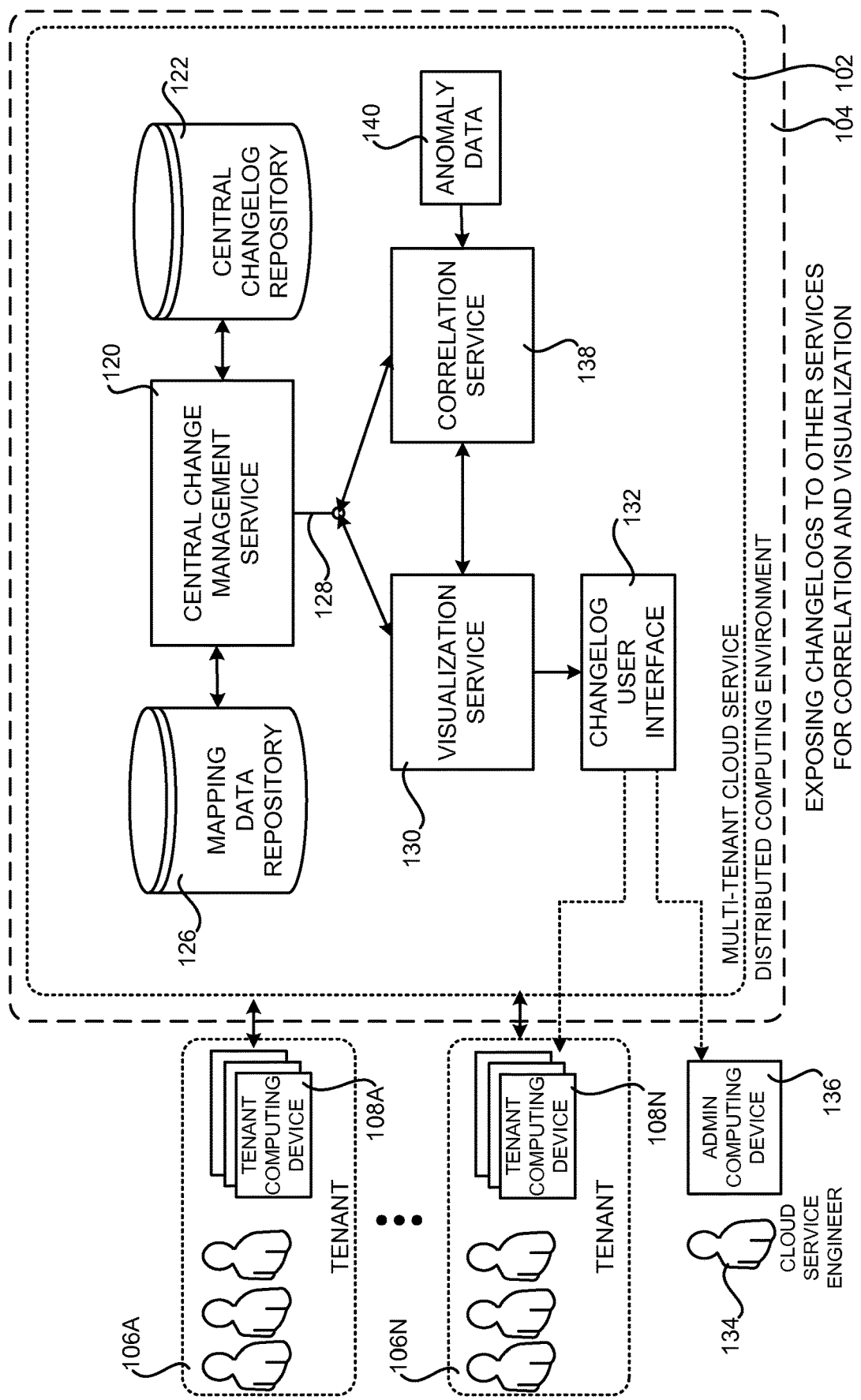
FIG. 1B is a computer system architecture diagram showing additional aspects of the operation of the central change management service shown in FIG. 1A.

FIG. 1B is a computer system architecture diagram showing additional aspects of the operation of the central change management service 120 shown in FIG. 1A and described above. As shown in FIG. 1B, a correlation service 138 also executes in conjunction with the provision of the multi-tenant cloud service 102 in one configuration. The correlation service 138 is configured to correlate changelogs 118 exposed by the CCMS 120 with anomalies or other events occurring in the multi-tenant cloud service 102. In order to provide this functionality, the correlation service 138 can utilize anomaly data 140 that describes anomalies occurring in the multi-tenant cloud service 102, along with the mapping data 124 and changelogs 118 obtained from the CCMS 120. The anomaly data 140 can be generated by services executing in the multi-tenant cloud service 102 that are configured to detect and report on anomalies occurring in the multi-tenant cloud service 102, such as service interruptions, hardware or software failures, UI experience anomalies, and others.

In one configuration, the CCMS 120 and the correlation service 138 operate in conjunction with a visualization service 130 that can provide a graphical UI (shown as the changelog UI 136 in FIG. 1B), through which both tenants 106 and engineers associated with the multi-tenant cloud service 102 (such as the engineer 134 using the admin computing device 136) can be provided with data identifying the correlation between a change described by a changelog 118 and an anomaly in the multi-tenant cloud service 102 that potentially or actually impacts a tenant 106. Other types of correlations can also be performed by the correlation service 138 and visualized in the changelog UI 132 provided by the visualization service 130.

In some configurations, the changelogs 118 and the mapping data 124 described above can also be utilized to determine the scope of impact for a change described by a changelog 118. For example, and without limitation, the mapping data 124 described above can be utilized to identify components in the multi-tenant cloud service 102 that can be impacted by a change described by one of the changelogs 118. For example, and without limitation, if a changelog 118 corresponds to change made to a load balancer device, the application servers 112 that are served by the load balancer can be identified in the UI 132 as components that can be impacted by the change. Data identifying the components in the multi-tenant cloud service 102 that are associated with a particular tenant 106 and that can be impacted by a particular change can then be identified in the changelog UI 132.

In a similar fashion, the changelogs 118 and the mapping data 124 can also be utilized to identify a change described by a changelog 118 that might have caused an anomaly impacting one or more components in the multi-tenant cloud service 102 that are associated with a particular tenant 106. For instance, if a particular application server 112 that is utilized to serve a tenant 106 is experiencing an anomaly, changelogs 118 corresponding to changes made to upstream components (e.g. a load balancer, switch, router, etc.) might be identified as potentially impacting the tenant 106. In this example, the changelog 118 corresponding to the change that potentially impacted the tenant 106 can also be identified in the changelog UI 132. In this way, a single tenant 106 (or an engineer 136) of the multi-tenant cloud service 102 can be provided with data showing tenant-specific software and hardware components that can be impacted by a change and/or the changes that can impact components used to provide the multi-tenant cloud service 102 to the tenant 106. The CCMS 120 and the other services described above and in further detail below can also provide other types of data in the changelog UI 132 relating to changes made in the multi-tenant cloud service 102 on a per-tenant 106 basis in other configurations.

Additional details regarding the functionality described above with regard to FIGS. 1A-2 will be provided below with regard to FIGS. 3-6. It should be appreciated that the service architecture shown in FIGS. 1A and 1B is merely illustrative and that many other configurations might be utilized. For example, and without limitation, the CCMS 120 might perform the various functions described herein as being performed by the changelog transformation service 116, the correlation service 138, and/or the visualization service 130. Other services not specifically mentioned herein might also perform the various functions described above and in further detail below. In this regard it should also be appreciated that the service architecture shown in FIGS. 1A and 1B has been greatly simplified for purposes of illustration and discussion, and that many more software and hardware components can be utilized than shown in the FIGS. Other configurations will also be apparent to those skilled in the art.

Figure 3:
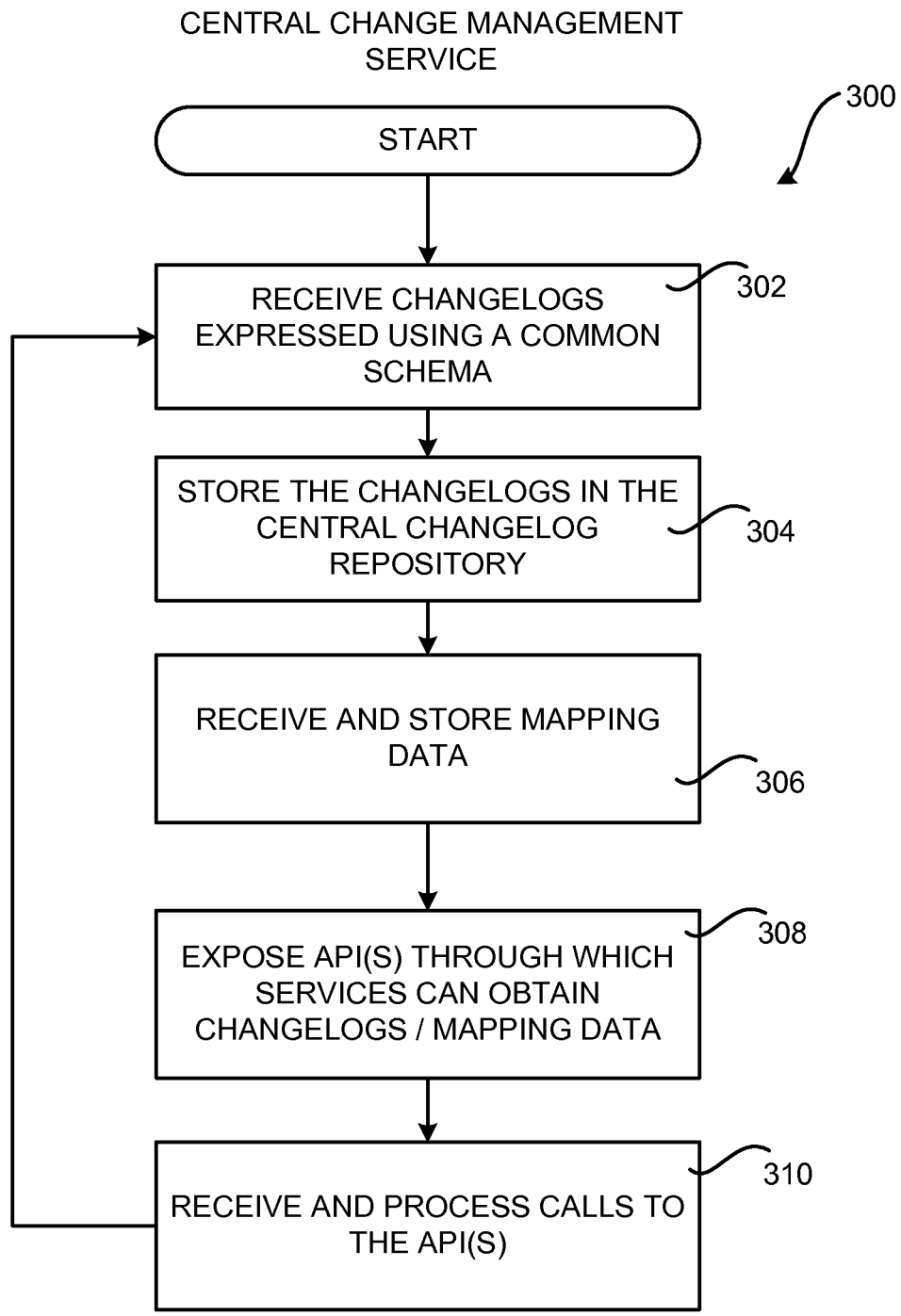
FIG. 3 is a flow diagram showing a routine that illustrates aspects of the operation of the central change management service shown in FIGS. 1A and 1B, according to one implementation disclosed herein.

FIG. 3 is a flow diagram showing a routine 300 that illustrates aspects of the operation of the central change management service 120 shown in FIGS. 1A and 1B and described above, according to one implementation disclosed herein. It should be appreciated that the logical operations described herein with regard to FIG. 3 and the other FIGS. can be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules can be implemented in software, in firmware, in special purpose digital logic, and any combination thereof. It should also be appreciated that more or fewer operations can be performed than shown in the FIGS. and described herein. These operations can also be performed in a different order than those described herein.

The routine 300 begins at operation 302, where the CCMS 120 receives the changelogs 118 expressed using the common schema from the changelog transformation service 116. The routine 300 then proceeds to operation 302, where the CCMS 120 stores the changelogs 118 in the central changelog repository 122. As discussed above, in some configurations the changelog transformation service 116 stores the changelogs 118 in the central changelog repository 122 directly. Other configurations might also be utilized (as shown in FIG. 1A) wherein the changelog transformation service 116 stores the changelogs 118 in the central changelog repository 122.

From operation 304, the routine 300 proceeds to operation 306, where the CCMS 120 can receive and store mapping data 124 in the mapping data repository 126. As shown in FIG. 1A, the mapping data 124 can be provided by network services in conjunction with the provision of the changelogs 114 in one configuration. In another configuration, a network service is dedicated to maintaining the mapping data 124 and providing the mapping data 124 to the CCMS 120. Other configurations can also be utilized.

From operation 306, the routine 300 proceeds to operation 308. At operation 308, the CCMS 120 exposes an API 128 through which network services internal to the multi-tenant cloud service 102 can retrieve, search, filter, sort, and perform other operations on the changelogs 118 contained in the central changelog repository 122. In some configurations, the API 128 can also expose functionality for allowing network services to also obtain the mapping data 124 relevant to a particular changelog 118. Other services might provide functionality for obtaining the mapping data 124 in other configurations.

From operation 308, the routine 300 proceeds to operation 310, where the CCMS 120 receives and processes calls to the API 128 made by network services. For example, and without limitation, the visualization service 130 might call the API 128 with a request for changelogs 118 relevant to a particular tenant 106 within a certain time period. In response thereto, the CCMS 120 may search the central changelog repository 122 for the matching changelogs 118, sort and/or filter the returned changelogs 118, and provide the sorted/filtered changelogs 118 in response to the call to the API 128. Other calls to the API 128 can be processed in a similar manner. From operation 310, the routine 300 proceeds back to operation 302, where additional changelogs 118 and calls to the API 128 can be processed in a similar fashion.

Figure 4:
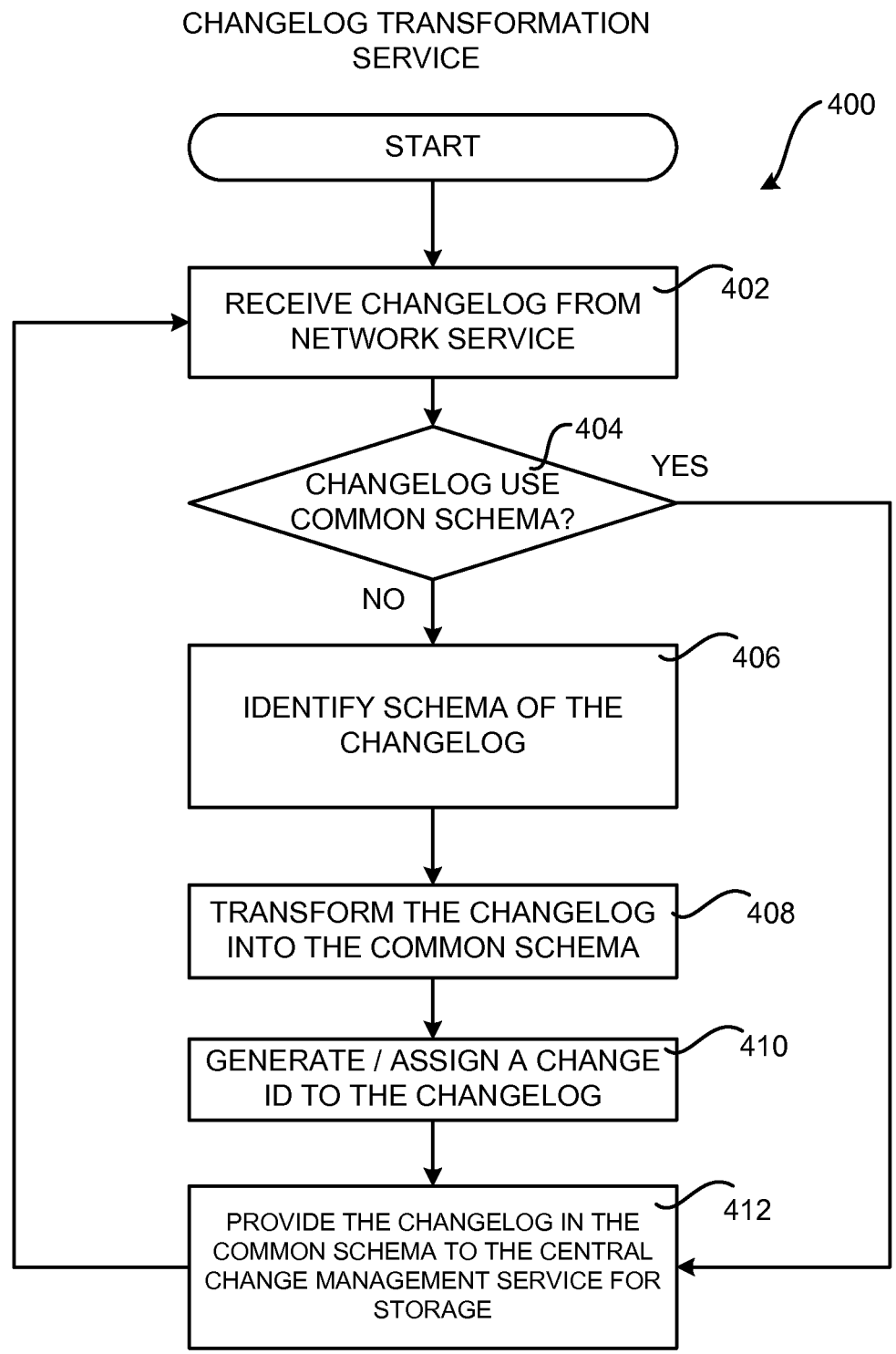
FIG. 4 is a flow diagram showing a routine that illustrates aspects of the operation of a changelog transformation service that operates in conjunction with the central change management service in one implementation disclosed herein.

FIG. 4 is a flow diagram showing a routine 400 that illustrates aspects of the operation of the changelog transformation service 116, which operates in conjunction with the central change management service 120 in one implementation disclosed herein. The routine 400 begins at operation 402, where the changelog transformation service 116 receives a changelog 114 from a network service executing in the multi-tenant cloud service 102, such as from the orchestration service 110. The routine 400 then proceeds to operation 402, where the changelog transformation service 116 determines whether the received changelog 118 is already expressed using the common schema described above. If the received changelog 118 has been formatted using the common schema, the routine 400 proceeds from operation 404 to operation 412, where the changelog transformation service 116 provides the received changelog to the CCMS 120 for storage in the central changelog repository 122. Alternately, the changelog transformation service 116 can store the received changelog in the central changelog repository 122 itself.

If, at operation 404, the changelog transformation service 116 determines that the received changelog 114 is not expressed using the common schema, the routine 400 proceeds from operation 404 to operation 406. At operation 406, the changelog transformation service 116 identifies the schema that has been utilized to format the received changelog 114. The routine 400 then proceeds from operation 406 to operation 408, there the changelog transformation service 116 transforms the received changelog 114 to a changelog 118 expressed using the common schema, as discussed above. As also discussed above, the changelog 118 can include the data described above with regard to FIG. 3 in some configurations.

From operation 408, the routine 400 proceeds to operation 410, where a unique ID is generated and assigned to the transformed changelog 118 in the common schema. The routine 400 then proceeds to operation 412, where the changelog transformation service 116 provides the received changelog to the CCMS 120 for storage in the central changelog repository 122. Alternately, the changelog transformation service 116 can store the received changelog in the central changelog repository 122 itself (as shown in FIG. 1A). The routine 400 then proceeds from operation 412 back to operation 402, where additional changelogs 114 can be received and processed in a similar manner.

Figure 5:
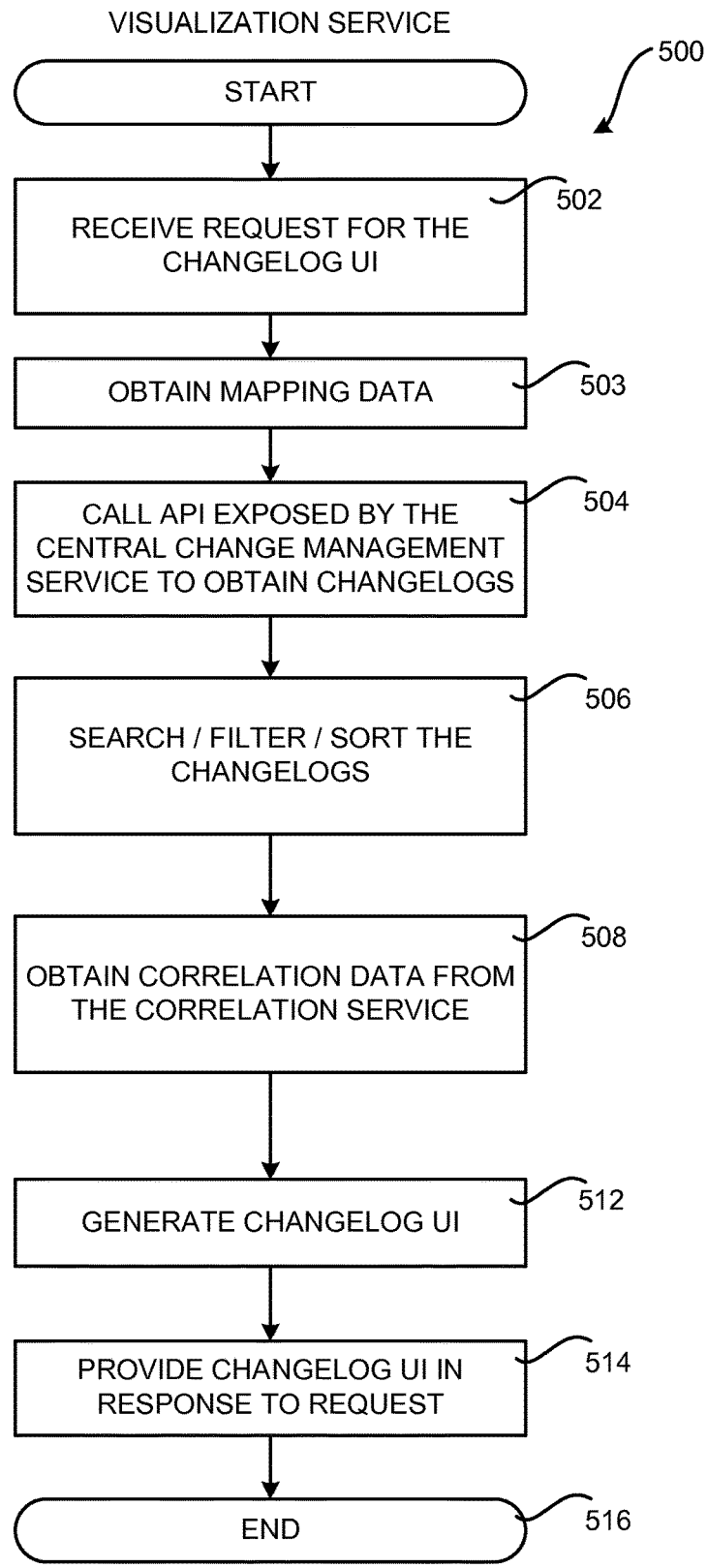
FIG. 5 is a flow diagram showing a routine that illustrates aspects of the operation of a visualization service that operates in conjunction with the central change management service in one implementation disclosed herein.

FIG. 5 is a flow diagram showing a routine 500 that illustrates aspects of the operation of the visualization service 130 that operates in conjunction with the central change management service 120 in one implementation disclosed herein. The routine 500 begins at operation 502, where the visualization service 130 receives a request for the changelog UI 132. As discussed above, for example, a tenant 106 can request the changelog UI 132 using a tenant computing device 108. Similarly, a cloud service engineer 134 can request the changelog UI 132 using an admin computing device 136. The request might specify that the changelog UI 132 should indicate the changelogs 118 relevant to a particular tenant 106, identify changelogs 118 corresponding to changes that might impact components serving the tenant 106, and/or identify components serving the tenant 106 that might be impacted by planned or implemented changes.

From operation 502, the routine 500 proceeds to operation 503, where visualization service 130 obtains the mapping data 124. As discussed above, the mapping data 124 can describe the physical and/or logical relationships between software and hardware components in the multi-tenant cloud service 102. The mapping data 124 can also provide a mapping between software and hardware components in the multi-tenant cloud service 102 and the tenants (i.e. organizations) or users (i.e. individuals) that they serve.

From operation 503, the routine 500 proceeds to operation 504, where the visualization service 130 calls the API 128 exposed by the CCMS 120 to obtain the changelogs 118 relevant to the tenant identified in the request received at operation 502. The mapping data 124 can be utilized to determine the relevant changelogs 118. The visualization service 130 may then sort, filter, search, or otherwise process the returned changelogs 118 at operation 506. Alternately, or in addition thereto, the CCMS 120 may perform sorting, filtering, or other operations on the changelogs 118 relevant to the identified tenant.

From operation 506, the routine 500 proceeds to operation 508, where the visualization service 130 might obtain correlation data for the tenant from the correlation service 138. As discussed above, the correlation data might indicate a correlation between a change identified by a changelog 118 and an anomaly, for instance.

From operation 508, the routine 500 proceeds to operations 512 and 514, where the visualization service 130 generates the changelog UI 132 and provides the changelog UI 132 in response to the request received at operation 502. As discussed above, the changelog UI 132 can identify the changelogs 118 relevant to a particular tenant 106, can identify changes that might impact components in the multi-tenant cloud service 102 utilized to serve the tenant 106, can identify components in the multi-tenant cloud service 102 used to serve the tenant 106 that might be impacted by changes, and/or other information. The routine 500 then proceeds from operation 514 to operation 516, where it ends.

Figure 6:
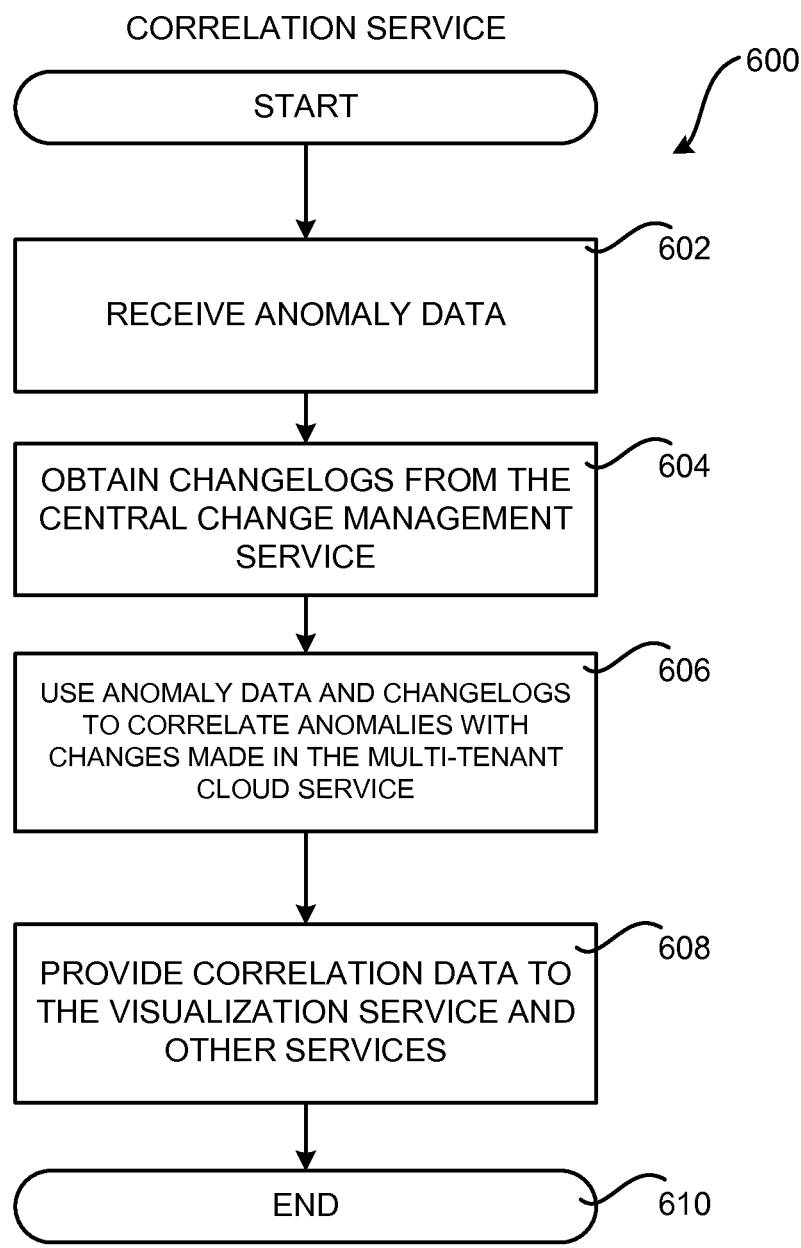
FIG. 6 is a flow diagram showing a routine that illustrates aspects of the operation of a correlation service that operates in conjunction with the central change management service in one implementation disclosed herein.

FIG. 6 is a flow diagram showing a routine 600 that illustrates aspects of the operation of the correlation service 138 that operates in conjunction with the central change management service 120 in one implementation disclosed herein. The routine 600 begins at operation 602, where the correlation service 138 receives the anomaly data 140. As discussed above, the anomaly data 140 describes anomalies in the multi-tenant cloud service 102 such as, but not limited to, service outages, problems with particular software or hardware components, user experience anomalies, and potentially others. The anomaly data 140 can be provided by a service configured to monitor for anomalies and to expose anomaly data 140 to other services that describes the anomalies.

From operation 602, the routine 600 proceeds to operation 604, where the correlation service 138 obtains changelogs 118 from the CCMS 120 through the API 128. The routine 600 then proceeds to operation 606, where the correlation service 138 utilizes the changelogs 118 and the anomaly data 140 to correlate changes made in the multi-tenant cloud service 102 with anomalies. The correlation service 138 might also utilize the mapping data 124 during this process.

For example, and without limitation, the anomaly data 140 might indicate that a particular application server 112 is not receiving network traffic. In this case, a changelog 118 and the mapping data 124 might indicate that a change was made to a router that serves the application server 112. In this case, the changelog 118 can be correlated to the anomaly. This information can then be presented in the changelog UI 132 in the manner described above at operation 608. The routine 600 then proceeds to operation 610, where it ends.

It should be appreciate that, in some configurations, the correlation service 138 can create a change graph (not shown in the FIGS.) that relates changes identified by changelogs 118 with other changes. The change graph can also include aspects of the mapping data 124, which specify the logical and/or physical relationships between various hardware and software components utilized to implement the multi-tenant cloud service 102.

The change graph can also be utilized in the manner described above to identify a change to a component that is the cause of an anomaly with another component. The change graph can also be utilized in a similar manner to determine the scope of the impact of a change. For example, and without limitation, a small change (e.g. a change to a configuration parameter) can have a large impact, while a large change (e.g. deployment of program code to a large number of servers) can have a small impact. The change graph can be utilized in real or near real time to identify a change responsible for an anomaly along with the scope of the impact of the change. This information can then be presented in the changelog UI 132 or provided to a tenant 106 in another manner.

It should also be appreciated that, in some configurations, the correlation service 138 can be configured to correlate changes identified by changelogs 118 with other types of data. For example, and without limitation, the correlation service 138 can be configured to correlate changelogs 118 with the number of calls for technical support being received at a particular point in time. The correlation service 138 can correlate the changelogs 118 with other types of data in other configurations and provide data in the changelog UI 132 identifying the correlation.

It should be further appreciated that some or all of the information presented in the changelog UI 132 might also be provided to tenants 106 in other ways in other configurations. For example, and without limitation, the mechanism described above can be utilized to identify a change that has or may impact a tenant 106. A notification (e.g. a "push" notification or email message) that identifies the change and its actual or potential impact can then be provided to a tenant computing device 108. This information can also be utilized in issue diagnosis, change risk prediction, fast service recovery from anomalies, change life cycle management, and other scenarios.

Figure 7:
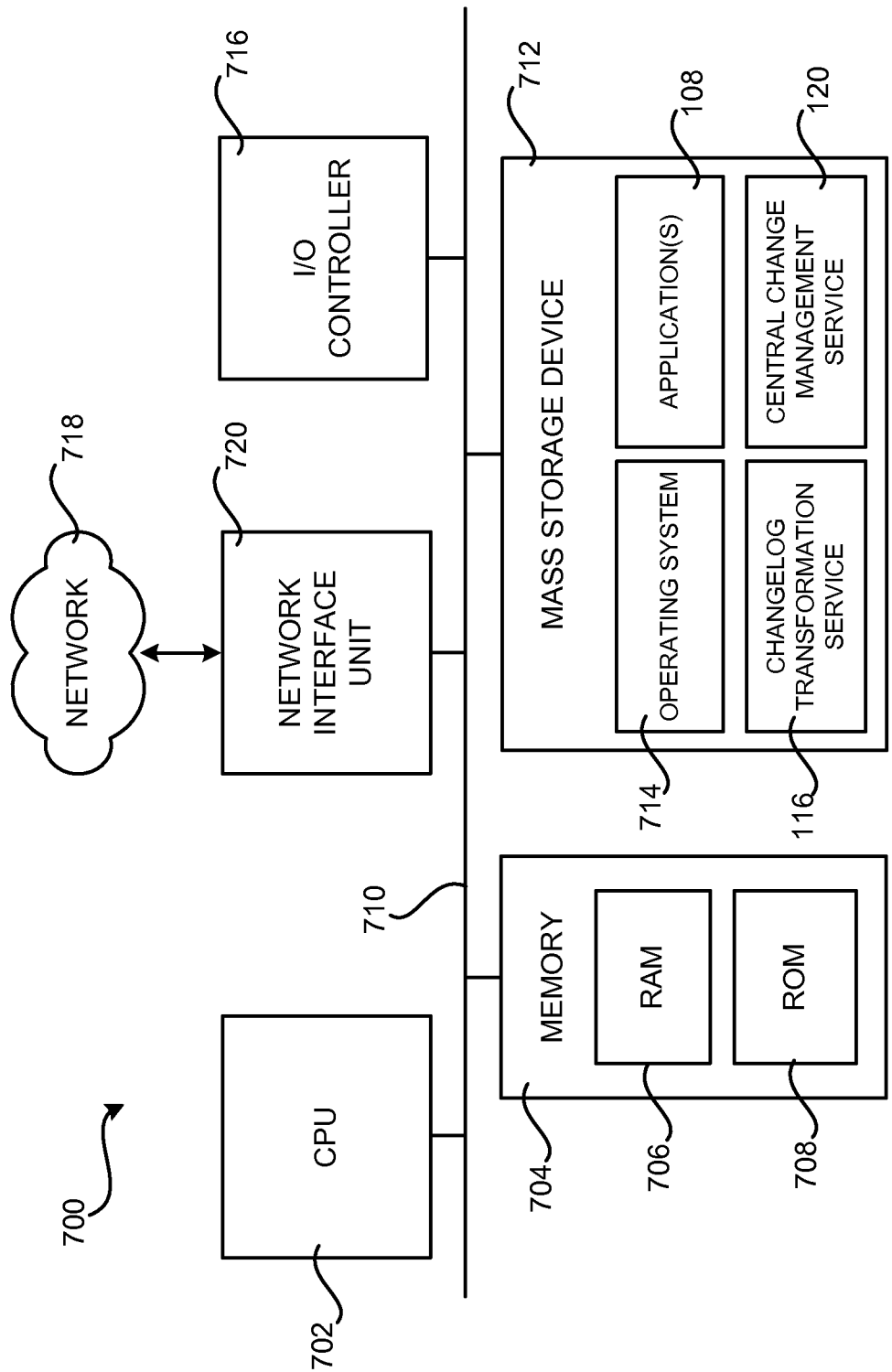
FIG. 7 is a computer architecture diagram illustrating an illustrative computer hardware and software architecture for a computing system capable of implementing aspects of the technologies presented herein.

FIG. 7 is a computer architecture diagram that shows an architecture for a computer 700 capable of executing the software components described herein for providing central change management for a multi-tenant cloud service 102. The architecture illustrated in FIG. 7 is an architecture for a server computer, mobile phone, an e-reader, a smart phone, a desktop computer, a netbook computer, a tablet computer, a laptop computer, or another type of computing device suitable for executing the software components presented herein. In this regard, it should be appreciated that the computer 700 shown in FIG. 7 can be utilized to implement a computing device capable of executing any of the software components presented herein. For example, and without limitation, the computer 700 can be utilized to implement a computing device capable of executing the CCMS 120, the changelog transformation service 116, and/or any of the other software components described above. The computer 700 can also be utilized to implement a computing device for interacting with the multi-tenant cloud service 102 such as, but not limited to, the tenant computing devices 108 and the admin computing device 136.

The computer 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer 700, such as during startup, is stored in the ROM 708. The computer 700 further includes a mass storage device 712 for storing the operating system 714 and one or more programs including, but not limited to, the central change management service 120 and the changelog transformation service 116. Although not shown in FIG. 7, the mass storage device 712 can also be configured to store other types of programs and data, such as the changelogs 118.

The mass storage device 712 is connected to the CPU 702 through a mass storage controller (not shown) connected to the bus 710. The mass storage device 712 and its associated computer readable media provide non-volatile storage for the computer 700. Although the description of computer readable media contained herein refers to a mass storage device, such as a hard disk or CD-ROM drive, it should be appreciated by those skilled in the art that computer readable media can be any available computer storage media or communication media that can be accessed by the computer 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 700. For purposes of the claims, the phrase "computer storage medium," and variations thereof, does not include waves or signals per se or communication media.

According to various configurations, the computer 700 can operate in a networked environment using logical connections to remote computers through a network such as the network 718. The computer 700 can connect to the network 718 through a network interface unit 720 connected to the bus 710. It should be appreciated that the network interface unit 720 also can be utilized to connect to other types of networks and remote computer systems. The computer 700 also can include an input/output controller 716 for receiving and processing input from a number of other devices, including a keyboard, mouse, or electronic stylus (not shown in FIG. 7). Similarly, the input/output controller 716 can provide output to a display screen, a printer, or other type of output device (also not shown in FIG. 7).

It should be appreciated that the software components described herein can, when loaded into the CPU 702 and executed, transform the CPU 702 and the overall computer 700 from a general-purpose computing system into a special-purpose computing system customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein also can transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the computer 700 can include other types of computing devices, including hand-held computers, embedded computer systems, mobile devices such as smartphones and tablets, and other types of computing devices known to those skilled in the art. It is also contemplated that the computer 700 might not include all of the components shown in FIG. 7, can include other components that are not explicitly shown in FIG. 7, or can utilize an architecture completely different than that shown in FIG. 7.

Figure 8:
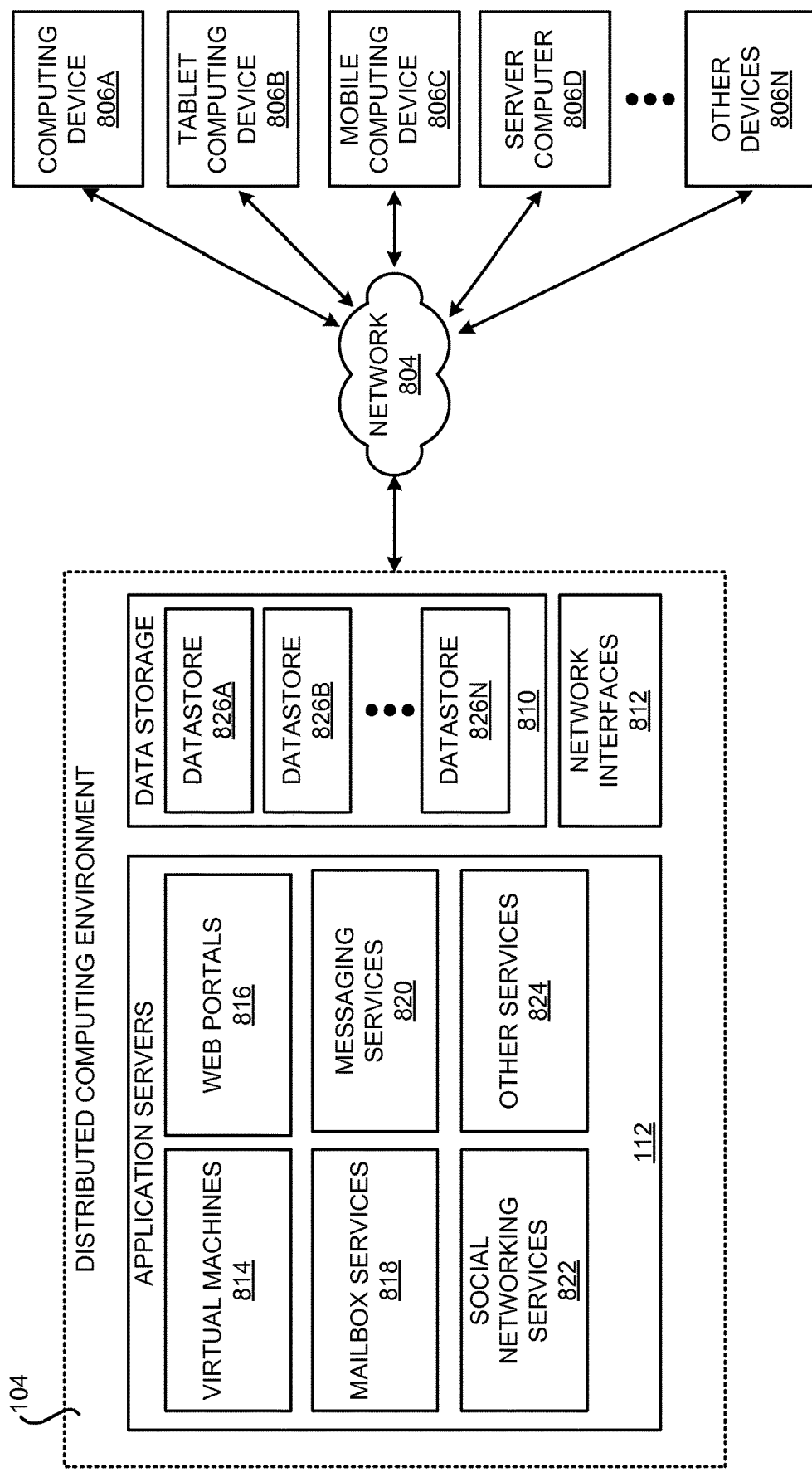
FIG. 8 is a diagram illustrating a distributed computing environment capable of implementing aspects of the technologies presented herein.

FIG. 8 illustrates an illustrative distributed computing environment 104 capable of executing the software components described herein for providing central change management for a multi-tenant cloud service 102. Thus, the distributed computing environment 104 illustrated in FIG. 8 can be used to provide the functionality described herein with respect to FIGS. 1-6 and/or any of the other software components described herein.

According to various implementations, the distributed computing environment 104 operates on, in communication with, or as part of a network 804. One or more client devices 806A-806N (hereinafter referred to collectively and/or generically as "clients 806") can communicate with the distributed computing environment 104 via the network 804 and/or other connections (not illustrated in FIG. 8). In the illustrated configuration, the clients 806 include: a computing device 806A such as a laptop computer, a desktop computer, or other computing device; a "slate" or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the distributed computing environment 104. Two example computing architectures for the clients 806 are illustrated and described herein with reference to FIGS. 7 and 9. It should be understood that the illustrated clients 806 and computing architectures illustrated and described herein are illustrative, and should not be construed as being limited in any way.

In the illustrated configuration, the distributed computing environment 104 includes application servers 112, data storage 810, and one or more network interfaces 812. According to various implementations, the functionality of the application servers 112 can be provided by one or more server computers that are executing as part of, or in communication with, the network 804. The application servers 112 can host various services such as those described herein, virtual machines, portals, and/or other resources. In the illustrated configuration, the application servers 112 host one or more virtual machines 814 for hosting applications or other functionality. According to various implementations, the virtual machines 814 host one or more applications and/or software modules, such as the central change management service 120. It should be understood that this configuration is illustrative, and should not be construed as being limiting in any way. The application servers 112 might also host or provide access to one or more Web portals, link pages, Web sites, and/or other information ("Web portals") 816.

According to various implementations, the application servers 112 also include one or more mailbox services 818 and one or more messaging services 820. The mailbox services 818 can include electronic mail ("email") services. The mailbox services 818 also can include various personal information management ("PIM") services including, but not limited to, calendar services, contact management services, collaboration services, and/or other services. The messaging services 820 can include, but are not limited to, instant messaging ("IM") services, chat services, forum services, and/or other communication services.

The application servers 112 also can include one or more social networking services 822. The social networking services 822 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 822 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 822 are provided by other services, sites, and/or providers that might be referred to as "social networking providers." For example, some Web sites allow users to interact with one another via email, chat services, and/or other means during various activities and/or contexts such as reading published articles, commenting on goods or services, publishing, collaboration, gaming, and the like. Other services are possible and are contemplated.

The social networking services 822 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 822 are not mentioned herein for the sake of brevity. As such, the configurations described above are illustrative, and should not be construed as being limited in any way.

As also shown in FIG. 8, the application servers 112 also can host other services, applications, portals, and/or other resources ("other services") 824. The other services 824 can include, but are not limited to, the central change management service 120, the changelog transformation service 116, the visualization service 130, the correlation service 138, and/or any of the other software components described herein. It thus can be appreciated that the distributed computing environment 104 can provide integration of the concepts and technologies disclosed herein provided herein for central change management for a multi-tenant cloud service 102 with various mailbox, messaging, social networking, productivity and/or other types of multi-tenant cloud services or resources.

As mentioned above, the computing environment 104 can include data storage 810. According to various implementations, the functionality of the data storage 810 is provided by one or more databases operating on, or in communication with, the network 804. The functionality of the data storage 810 also can be provided by one or more server computers configured to host data for the distributed computing environment 104. The data storage 810 can include, host, or provide one or more real or virtual datastores 826A-826N (hereinafter referred to collectively and/or generically as "datastores 826"). The datastores 826 are configured to host data used or created by the application servers 112 and/or other data. For example, the datastores 826 can be utilized to store the changelogs 118, and/or other types of data.

The distributed computing environment 104 can communicate with, or be accessed by, the network interfaces 812. The network interfaces 812 can include various types of network hardware and software for supporting communications between two or more computing devices including, but not limited to, the clients 806 and the application servers 112. It should be appreciated that the network interfaces 812 can also be utilized to connect to other types of networks and/or computer systems.

It should be understood that the distributed computing environment 104 described herein can implement any aspects of the software elements described herein with any number of virtual computing resources and/or other distributed computing functionality that can be configured to execute any aspects of the software components disclosed herein. According to various implementations of the concepts and technologies disclosed herein, the distributed computing environment 104 provides the software functionality described herein as a service to the clients 806. It should be understood that the clients 806 can also include real or virtual machines including, but not limited to, server computers, Web servers, personal computers, mobile computing devices, smart phones, and/or other devices. As such, various implementations of the concepts and technologies disclosed herein enable any device configured to access the distributed computing environment 104 to utilize the functionality described herein for central change management for a multi-tenant cloud service 102.

Figure 9:
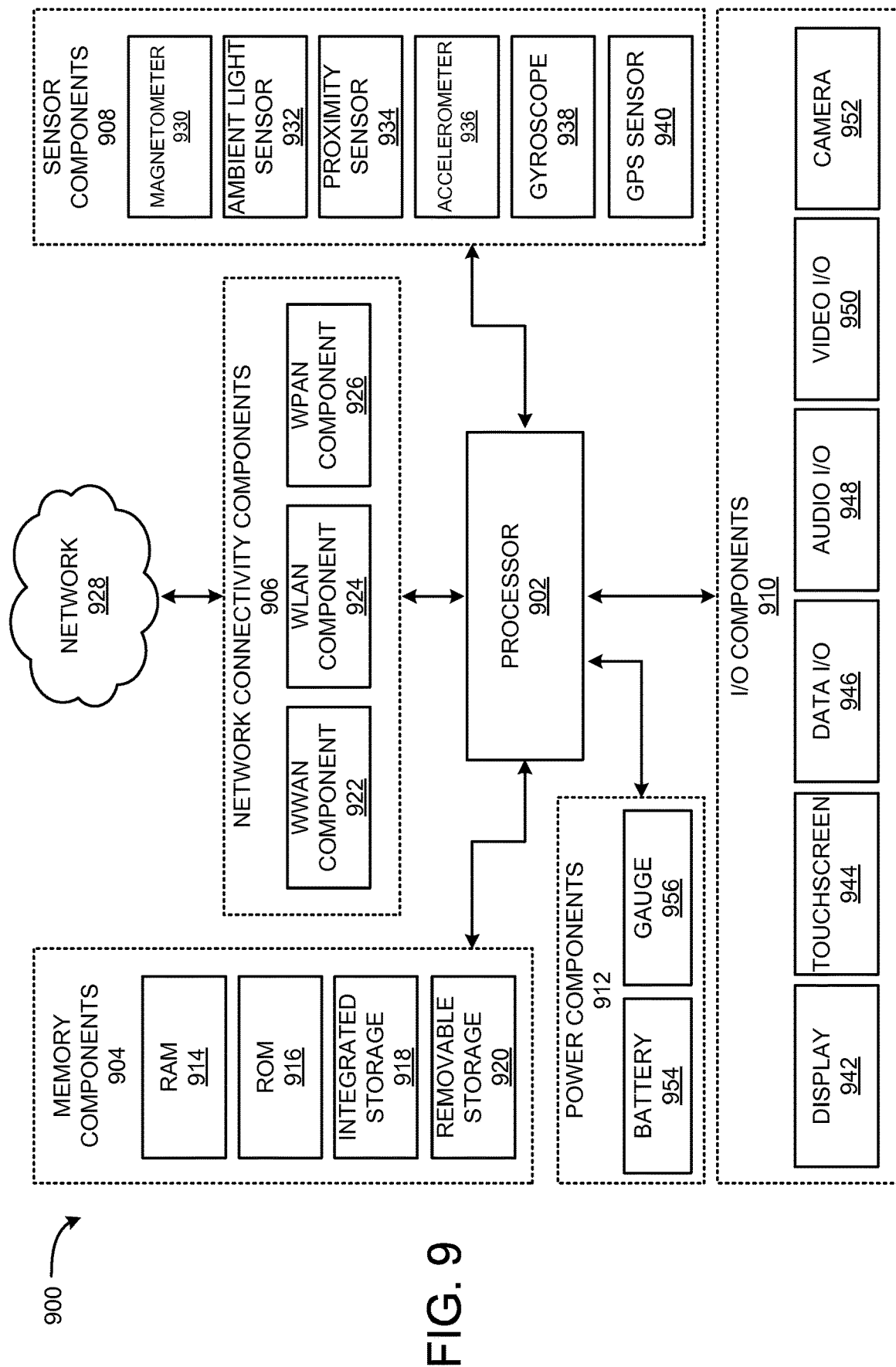
FIG. 9 is a computer architecture diagram illustrating a computing device architecture capable of implementing aspects of the technologies presented herein.

Turning now to FIG. 9, an illustrative computing device architecture 900 will be described for a computing device that is capable of executing various software components described herein central change management for a multi-tenant cloud service 102. The computing device architecture 900 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 900 is also applicable to any of the clients 806 shown in FIG. 8. Furthermore, aspects of the computing device architecture 900 are applicable to traditional desktop computers, portable computers (e.g., laptops, notebooks, ultra-portables, and netbooks), server computers, and other computer systems, such as described herein with reference to FIG. 7. For example, the single touch and multi-touch aspects disclosed herein below can be applied to desktop computers that utilize a touchscreen or some other touch-enabled device, such as a touch-enabled track pad or touch-enabled mouse. The computing device architecture 900 can also be utilized to implement the tenant computing devices 108, the admin computing device 136, and other types of computing devices for implementing or consuming the functionality described herein.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes one or more central processing unit ("CPU") cores configured to process data, execute computer-executable instructions of one or more application programs, and communicate with other components of the computing device architecture 900 in order to perform various functionality described herein. The processor 902 can be utilized to execute aspects of the software components presented herein and, particularly, those that utilize, at least in part, a touch-enabled input.

In some configurations, the processor 902 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, 4K, and greater), video games, 3D modeling applications, and the like. In some configurations, the processor 902 is configured to communicate with a discrete GPU (not shown). In any case, the CPU and GPU can be configured in accordance with a co-processing CPU/GPU computing model, wherein the sequential part of an application executes on the CPU and the computationally-intensive part is accelerated by the GPU.

In some configurations, the processor 902 is, or is included in, a system-on-chip ("SoC") along with one or more of the other components described herein below. For example, the SoC can include the processor 902, a GPU, one or more of the network connectivity components 906, and one or more of the sensor components 908. In some configurations, the processor 902 is fabricated, in part, utilizing a package-on-package ("PoP") integrated circuit packaging technique. Moreover, the processor 902 can be a single core or multi-core processor.

The processor 902 can be created in accordance with an ARM architecture, available for license from ARM HOLDINGS of Cambridge, United Kingdom. Alternatively, the processor 902 can be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a RAM 914, a ROM 916, an integrated storage memory ("integrated storage") 918, and a removable storage memory ("removable storage") 920. In some configurations, the RAM 914 or a portion thereof, the ROM 916 or a portion thereof, and/or some combination the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 or the removable storage 920.

The integrated storage 918 can include a solid-state memory, a hard disk, or a combination of solid-state memory and a hard disk. The integrated storage 918 can be soldered or otherwise connected to a logic board upon which the processor 902 and other components described herein might also be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available and shown to a user as a total combined capacity of the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system includes, but is not limited to, the WINDOWS MOBILE OS, the WINDOWS PHONE OS, or the WINDOWS OS from MICROSOFT CORPORATION, BLACKBERRY OS from RESEARCH IN MOTION, LTD. of Waterloo, Ontario, Canada, IOS from APPLE INC. of Cupertino, Calif., and ANDROID OS from GOOGLE, INC. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from a network 928, which can be a WWAN, a WLAN, or a WPAN. Although a single network 928 is illustrated, the network connectivity components 906 can facilitate simultaneous communication with multiple networks. For example, the network connectivity components 906 can facilitate simultaneous communications with multiple networks via one or more of a WWAN, a WLAN, or a WPAN.

The network 928 can be a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 928 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 928 can be configured to provide voice and/or data communications with any combination of the above technologies. The network 928 can be configured to or adapted to provide voice and/or data communications in accordance with future generation technologies.

In some configurations, the WWAN component 922 is configured to provide dual-multi-mode connectivity to the network 928. For example, the WWAN component 922 can be configured to provide connectivity to the network 928, wherein the network 928 provides service via GSM and UMTS technologies, or via some other combination of technologies. Alternatively, multiple WWAN components 922 can be utilized to perform such functionality, and/or provide additional functionality to support other non-compatible technologies (i.e., incapable of being supported by a single WWAN component). The WWAN component 922 can facilitate similar connectivity to multiple networks (e.g., a UMTS network and an LTE network).

The network 928 can be a WLAN operating in accordance with one or more Institute of Electrical and Electronic Engineers ("IEEE") 104.11 standards, such as IEEE 104.11a, 104.11b, 104.11g, 104.11n, and/or future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 928 via the WI-FI access points. Such connections can be secured via various encryption technologies including, but not limited, WI-FI Protected Access ("WPA"), WPA2, Wired Equivalent Privacy ("WEP"), and the like.

The network 928 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 930, an ambient light sensor 932, a proximity sensor 934, an accelerometer 936, a gyroscope 938, and a Global Positioning System sensor ("GPS sensor") 940. It is contemplated that other sensors, such as, but not limited to, temperature sensors or shock detection sensors, might also be incorporated in the computing device architecture 900.

The magnetometer 930 is configured to measure the strength and direction of a magnetic field. In some configurations the magnetometer 930 provides measurements to a compass application program stored within one of the memory components 904 in order to provide a user with accurate directions in a frame of reference including the cardinal directions, north, south, east, and west. Similar measurements can be provided to a navigation application program that includes a compass component. Other uses of measurements obtained by the magnetometer 930 are contemplated.

The ambient light sensor 932 is configured to measure ambient light. In some configurations, the ambient light sensor 932 provides measurements to an application program stored within one the memory components 904 in order to automatically adjust the brightness of a display (described below) to compensate for low light and bright light environments. Other uses of measurements obtained by the ambient light sensor 932 are contemplated.

The proximity sensor 934 is configured to detect the presence of an object or thing in proximity to the computing device without direct contact. In some configurations, the proximity sensor 934 detects the presence of a user's body (e.g., the user's face) and provides this information to an application program stored within one of the memory components 904 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 934 are contemplated.

The accelerometer 936 is configured to measure proper acceleration. In some configurations, output from the accelerometer 936 is used by an application program as an input mechanism to control some functionality of the application program. In some configurations, output from the accelerometer 936 is provided to an application program for use in switching between landscape and portrait modes, calculating coordinate acceleration, or detecting a fall. Other uses of the accelerometer 936 are contemplated.

The gyroscope 938 is configured to measure and maintain orientation. In some configurations, output from the gyroscope 938 is used by an application program as an input mechanism to control some functionality of the application program. For example, the gyroscope 938 can be used for accurate recognition of movement within a 3D environment of a video game application or some other application. In some configurations, an application program utilizes output from the gyroscope 938 and the accelerometer 936 to enhance control of some functionality of the application program. Other uses of the gyroscope 938 are contemplated.

The GPS sensor 940 is configured to receive signals from GPS satellites for use in calculating a location. The location calculated by the GPS sensor 940 can be used by any application program that requires or benefits from location information. For example, the location calculated by the GPS sensor 940 can be used with a navigation application program to provide directions from the location to a destination or directions from the destination to the location. Moreover, the GPS sensor 940 can be used to provide location information to an external location-based service, such as E911 service. The GPS sensor 940 can obtain location information generated via WI-FI, WIMAX, and/or cellular triangulation techniques utilizing one or more of the network connectivity components 906 to aid the GPS sensor 940 in obtaining a location fix. The GPS sensor 940 can also be used in Assisted GPS ("A-GPS") systems.

The I/O components 910 include a display 942, a touchscreen 944, a data I/O interface component ("data I/O") 946, an audio I/O interface component ("audio I/O") 948, a video I/O interface component ("video I/O") 950, and a camera 952. In some configurations, the display 942 and the touchscreen 944 are combined. In some configurations two or more of the data I/O component 946, the audio I/O component 948, and the video I/O component 950 are combined. The I/O components 910 can include discrete processors configured to support the various interface described below, or might include processing functionality built-in to the processor 902.

The display 942 is an output device configured to present information in a visual form. In particular, the display 942 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 942 is a liquid crystal display ("LCD") utilizing any active or passive matrix technology and any backlighting technology (if used). In some configurations, the display 942 is an organic light emitting diode ("OLED") display. Other display types are contemplated.

The touchscreen 944 is an input device configured to detect the presence and location of a touch. The touchscreen 944 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 944 is incorporated on top of the display 942 as a transparent layer to enable a user to use one or more touches to interact with objects or other information presented on the display 942. In other configurations, the touchscreen 944 is a touch pad incorporated on a surface of the computing device that does not include the display 942. For example, the computing device can have a touchscreen incorporated on top of the display 942 and a touch pad on a surface opposite the display 942.

In some configurations, the touchscreen 944 is a single-touch touchscreen. In other configurations, the touchscreen 944 is a multi-touch touchscreen. In some configurations, the touchscreen 944 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 944. As such, a developer can create gestures that are specific to a particular application program.

In some configurations, the touchscreen 944 supports a tap gesture in which a user taps the touchscreen 944 once on an item presented on the display 942. The tap gesture can be used for various reasons including, but not limited to, opening or launching whatever the user taps. In some configurations, the touchscreen 944 supports a double tap gesture in which a user taps the touchscreen 944 twice on an item presented on the display 942. The double tap gesture can be used for various reasons including, but not limited to, zooming in or zooming out in stages. In some configurations, the touchscreen 944 supports a tap and hold gesture in which a user taps the touchscreen 944 and maintains contact for at least a pre-defined time. The tap and hold gesture can be used for various reasons including, but not limited to, opening a context-specific menu.

In some configurations, the touchscreen 944 supports a pan gesture in which a user places a finger on the touchscreen 944 and maintains contact with the touchscreen 944 while moving the finger on the touchscreen 944. The pan gesture can be used for various reasons including, but not limited to, moving through screens, images, or menus at a controlled rate. Multiple finger pan gestures are also contemplated. In some configurations, the touchscreen 944 supports a flick gesture in which a user swipes a finger in the direction the user wants the screen to move. The flick gesture can be used for various reasons including, but not limited to, scrolling horizontally or vertically through menus or pages. In some configurations, the touchscreen 944 supports a pinch and stretch gesture in which a user makes a pinching motion with two fingers (e.g., thumb and forefinger) on the touchscreen 944 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 944. As such, the above gestures should be understood as being illustrative and should not be construed as being limiting in any way.

The data I/O interface component 946 is configured to facilitate input of data to the computing device and output of data from the computing device. In some configurations, the data I/O interface component 946 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 948 is configured to provide audio input and/or output capabilities to the computing device. In some configurations, the audio I/O interface component 946 includes a microphone configured to collect audio signals. In some configurations, the audio I/O interface component 946 includes a headphone jack configured to provide connectivity for headphones or other external speakers. In some configurations, the audio interface component 948 includes a speaker for the output of audio signals. In some configurations, the audio I/O interface component 946 includes an optical audio cable out.

The video I/O interface component 950 is configured to provide video input and/or output capabilities to the computing device. In some configurations, the video I/O interface component 950 includes a video connector configured to receive video as input from another device (e.g., a video media player such as a DVD or BLURAY player) or send video as output to another device (e.g., a monitor, a television, or some other external display). In some configurations, the video I/O interface component 950 includes a High-Definition Multimedia Interface ("HDMI"), mini-HDMI, micro-HDMI, DisplayPort, or proprietary connector to input/output video content. In some configurations, the video I/O interface component 950 or portions thereof is combined with the audio I/O interface component 948 or portions thereof.

The camera 952 can be configured to capture still images and/or video. The camera 952 can utilize a charge coupled device ("CCD") or a complementary metal oxide semiconductor ("CMOS") image sensor to capture images. In some configurations, the camera 952 includes a flash to aid in taking pictures in low-light environments. Settings for the camera 952 can be implemented as hardware or software buttons.

Although not illustrated, one or more hardware buttons can also be included in the computing device architecture 900. The hardware buttons can be used for controlling some operational aspect of the computing device. The hardware buttons can be dedicated buttons or multi-use buttons. The hardware buttons can be mechanical or sensor-based.

The illustrated power components 912 include one or more batteries 954, which can be connected to a battery gauge 956. The batteries 954 can be rechargeable or disposable. Rechargeable battery types include, but are not limited to, lithium polymer, lithium ion, nickel cadmium, and nickel metal hydride. Each of the batteries 954 can be made of one or more cells.

The battery gauge 956 can be configured to measure battery parameters such as current, voltage, and temperature. In some configurations, the battery gauge 956 is configured to measure the effect of a battery's discharge rate, temperature, age and other factors to predict remaining life within a certain percentage of error. In some configurations, the battery gauge 956 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 912 can also include a power connector, which can be combined with one or more of the aforementioned I/O components 910. The power components 912 can interface with an external power system or charging equipment via a power I/O component 944.

The disclosure presented herein also encompasses the subject matter set forth in the following clauses:

Clause 1. A computer-implemented method for central management of changelogs corresponding to changes to components in a multi-tenant cloud service, the method comprising: obtaining changelogs from a plurality of services executing in the multi-tenant cloud service, the changelogs describing changes to the components in the multi-tenant cloud service and being expressed using a plurality of schemas; transforming the changelogs expressed using the plurality of schemas to changelogs expressed using a common schema; and exposing a network service application programming interface through which one or more other services executing in the multi-tenant cloud service can obtain the plurality of changelogs expressed using the common schema for a single tenant of the multi-tenant cloud service.

Clause 2. The computer-implemented method of clause 1, wherein the changelogs expressed using the common schema comprise one or more fields storing data identifying a time a change started, a time a change ended, an identifier (ID) for a changed component, and one or more properties of a change.

Clause 3. The computer-implemented method of clauses 1 and 2, further comprising assigning a unique identifier (ID) to each of the plurality of changelogs expressed using the common schema.

Clause 4. The computer-implemented method of clauses 1 through 3, further comprising: receiving a request for a user interface (UI) presenting one or more of the changelogs expressed using the common schema; in response to the request, calling the network service API to obtain the one or more of the changelogs expressed using the common schema; performing one or more processing operations on the one or more of the changelogs expressed using the common schema; and causing the UI to be presented, the UI comprising the one or more of the changelogs expressed using the common schema.

Clause 5. The computer-implemented method of clauses 1 through 4, further comprising: correlating the one or more of the changelogs expressed using the common schema with one or more anomalies detected in the multi-tenant cloud service; and presenting data in the UI showing the correlation between the one or more of the changelogs expressed using the common schema and the one or more anomalies in the multi-tenant cloud service.

Clause 6. The computer-implemented method of clauses 1 through 4, further comprising: obtaining mapping data that describes relationships between the components in the multi-tenant cloud service; utilizing the mapping data to identify one or more of the components in the multi-tenant cloud service that can be impacted by a change associated with one of the changelogs expressed using the common schema; and presenting data in the UI showing the identified one or more of the components in the multi-tenant cloud service that can be impacted by the change.

Clause 7. The computer-implemented method of clauses 1 through 4, further comprising: obtaining mapping data that describes relationships between the components in the multi-tenant cloud service; utilizing the mapping data to identify a change associated with one of the changelogs expressed using the common schema that might have impacted one or more of the components in the multi-tenant cloud service; and presenting data in the UI showing the identified change.

Clause 8. The computer-implemented method of clauses 1 through 4, wherein the one or more of the changelogs expressed using the common schema presented in the UI comprise changelogs corresponding to the single tenant of the multi-tenant cloud service.

Clause 9. A computer storage medium having computer executable instructions stored thereon which, when executed by a computer, cause the computer to: obtain changelogs from a plurality of services executing in a multi-tenant cloud service, the changelogs describing changes to components operating in the multi-tenant cloud service and being expressed using a plurality of schemas; transform the changelogs expressed using the plurality of schemas to changelogs expressed using a common schema; and expose a network service application programming interface through which one or more other services can obtain the plurality of changelogs (118) expressed using the common schema.

Clause 10. The computer storage medium of clause 9, having further computer executable instructions stored thereon to: receive a request for a user interface (UI) presenting one or more of the changelogs expressed using the common schema; call the network service API to obtain the one or more of the changelogs expressed using the common schema; perform one or more processing operations on the one or more of the changelogs expressed using the common schema; and cause the UI to be presented, the UI comprising the one or more of the changelogs expressed using the common schema.

Clause 11. The computer storage medium of clauses 9 and 10, having further computer executable instructions stored thereon to: correlate the one or more changelogs expressed using the common schema with one or more anomalies detected in the multi-tenant cloud service; and cause data to be presented in the UI showing the correlation between the one or more changelogs expressed using the common schema and the one or more anomalies in the multi-tenant cloud service.

Clause 12. The computer storage medium of clauses 9 through 11, having further computer executable instructions stored thereon to: obtain mapping data that describes relationships between the components in the multi-tenant cloud service; utilize the mapping data to identify one or more of the components in the multi-tenant cloud service that can be impacted by a change associated with one of the changelogs expressed using the common schema; and cause data to be presented in the UI showing the identified one or more of the components in the multi-tenant cloud service that can be impacted by the change.

Clause 13. The computer storage medium of clauses 9 through 12, having further computer executable instructions stored thereon to: obtain mapping data that describes relationships between the components in the multi-tenant cloud service; utilize the mapping data to identify a change associated with one of the changelogs expressed using the common schema that might have impacted one or more of the components in the multi-tenant cloud service; and cause data to be presented in the UI showing the identified change.

Clause 14. The computer storage medium of clauses 9 through 13, wherein the one or more of the changelogs expressed using the common schema presented in the UI comprise changelogs corresponding to a single tenant of the multi-tenant cloud service.

Clause 15. An apparatus, comprising: one or more processors; and at least one computer storage medium having computer executable instructions stored thereon which, when executed by the one or more processors, cause the apparatus to obtain changelogs from a plurality of services executing in a multi-tenant cloud service, the changelogs describing changes to components operating in the multi-tenant cloud service and being expressed using a plurality of schemas, transform the changelogs expressed using the plurality of schemas to changelogs expressed using a common schema, and expose a network service application programming interface through which one or more other services can obtain the plurality of changelogs expressed using the common schema.

Clause 16. The apparatus of clause 15, wherein the computer storage medium has further computer executable instructions stored thereon to: receive a request for a user interface (UI) presenting one or more of the changelogs expressed using the common schema; call the network service API to obtain the one or more of the changelogs expressed using the common schema; perform one or more processing operations on the one or more of the changelogs expressed using the common schema; and cause the UI to be presented, the UI comprising the one or more of the changelogs expressed using the common schema.

Clause 17. The apparatus of clauses 15 and 16, wherein the computer storage medium has further computer executable instructions stored thereon to: correlate the one or more changelogs expressed using the common schema with one or more anomalies detected in the multi-tenant cloud service; and cause data to be presented in the UI showing the correlation between the one or more changelogs expressed using the common schema and the one or more anomalies in the multi-tenant cloud service.

Clause 18. The apparatus of clauses 15 through 17, wherein the computer storage medium has further computer executable instructions stored thereon to: obtain mapping data that describes relationships between the components in the multi-tenant cloud service; utilize the mapping data to identify one or more of the components in the multi-tenant cloud service that can be impacted by a change associated with one of the changelogs expressed using the common schema; and cause data to be presented in the UI showing the identified one or more of the components in the multi-tenant cloud service that can be impacted by the change.

Clause 19. The apparatus of clauses 15 through 18, wherein the computer storage medium has further computer executable instructions stored thereon to: obtain mapping data that describes relationships between the components in the multi-tenant cloud service; utilize the mapping data to identify a change associated with one of the changelogs expressed using the common schema that might have impacted one or more of the components in the multi-tenant cloud service; and cause data to be presented in the UI showing the identified change.

Clause 20. The apparatus of clauses 15 through 19, wherein the one or more of the changelogs expressed using the common schema presented in the UI comprise changelogs corresponding to a single tenant of the multi-tenant cloud service.

Based on the foregoing, it should be appreciated that technologies for changelog transformation and correlation in a multi-tenant cloud service have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example configurations and applications illustrated and described, and without departing from the true spirit and scope of the present invention, which is set forth in the following claims.

What is claimed is:

1. A computer-implemented method for central management of changelogs corresponding to changes to components in a multi-tenant cloud service, the method comprising:
    obtaining, with a computer, changelogs from a plurality of services executing in the multi-tenant cloud service, the changelogs describing changes to the software or hardware of components in the multi-tenant cloud service and the changelogs being expressed using a plurality of schemas;
    transforming, with the computer, the changelogs expressed using the plurality of schemas to a plurality of changelogs expressed using a common schema, wherein each of the plurality of changelogs expressed using the common schema describes changes to a component in the multi-tenant cloud service;
    exposing, with the computer, a network service application programming interface (API) for accessing the plurality of changelogs expressed using the common schema;
    receiving, from a service executing in the multi-tenant cloud service, a call through the network service API for a set of changelogs included in the plurality of changelogs expressed using the common schema, the set of changelogs requested via the call describing changes to the components in the multi-tenant cloud service associated with a single tenant; and
    responding to the call by
        accessing mapping data describing relationships between the components and a plurality of tenants of the multi-tenant cloud service to determine a set of components in the multi-tenant cloud service servicing the single tenant,
        searching, based on the mapping data, the plurality of changelogs expressed using the common schema to identify changelogs associated with the set of components in the multi-tenant cloud service determined using the mapping data to be servicing the single tenant, and
        returning the changelogs identified from the plurality of changelogs associated with the set of components in the multi-tenant cloud service servicing the single tenant in response to the call.

2. The computer-implemented method of claim 1, wherein the plurality of changelogs expressed using the common schema comprise one or more fields storing
    data identifying a time a change started,
    a time a change ended,
    an identifier (ID) for a changed component, and
    one or more properties of a change.

3. The computer-implemented method of claim 1, further comprising assigning a unique identifier (ID) to each of the plurality of changelogs expressed using the common schema.

4. The computer-implemented method of claim 1, further comprising:
    receiving a request for a user interface (UI) presenting the set of changelogs; in response to the request, making the call to the network service API to obtain the set of changelogs;
performing one or more processing operations on the set of changelogs; and causing the UI to be presented, the UI comprising the set of changelogs.

5. The computer-implemented method of claim 4, further comprising:
    correlating the set of changelogs with one or more anomalies detected in the multi-tenant cloud service; and
    presenting data in the UI showing the correlation between the set of changelogs and the one or more anomalies in the multi-tenant cloud service.

6. The computer-implemented method of claim 4, further comprising:
    utilizing the mapping data to identify one or more of the components in the multi-tenant cloud service that can be impacted by a change associated with one changelog included in the set of changelogs; and
    presenting data in the UI showing the identified one or more of the components in the multi-tenant cloud service that can be impacted by the change.

7. The computer-implemented method of claim 4, further comprising:
    utilizing the mapping data to identify a change associated with one changelog included in the set of changelogs that might have impacted one or more of the components in the multi-tenant cloud service; and
    presenting data in the UI showing the identified change.

8. A non-transitory computer storage medium having computer executable instructions stored thereon which, when executed by a computer, cause the computer to:
    obtain changelogs from a plurality of services executing in a multi-tenant cloud service, the changelogs describing changes to software or hardware changes of components operating in the multi-tenant cloud service and the changelogs being expressed using a plurality of schemas;
    transform the changelogs expressed using the plurality of schemas to a plurality of changelogs expressed using a common schema, wherein each of the plurality of changelogs expressed using the common schema describes changes to a component in the multi-tenant cloud service;
    expose a network service application programming interface (API) for accessing the plurality of changelogs expressed using the common schema;
    receive, from a service executing in the multi-tenant cloud service, a call through the network service API for a set of changelogs included in the plurality of changelogs expressed using the common schema, the set of changelogs requested via the call describing changes to the components in the multi-tenant cloud service associated with a single tenant; and
    respond to the call by
        accessing mapping data describing relationships between the components and a plurality of tenants of the multi-tenant cloud service to determine a set of the components in the multi-tenant cloud service servicing the single tenant, searching, based on the mapping data, the plurality of changelogs expressed using the common schema to identify changelogs associated with the set of components in the multi-tenant cloud service determined using the mapping data to be servicing the single tenant, and returning the changelogs identified from the plurality of changelogs associated with the set of components in the multi-tenant cloud service servicing the single tenant in response to the call.

9. The non-transitory computer storage medium of claim 8, having further computer executable instructions stored thereon to:

receive a request for a user interface (UI) presenting the set of changelogs; make the call to the network service API to obtain the set of changelogs; perform one or more processing operations on the set of changelogs; and cause the UI to be presented, the UI comprising the set of changelogs.

10. The non-transitory computer storage medium of claim 9, having further computer executable instructions stored thereon to:

correlate the set of changelogs one or more changelogs expressed using the common schema with one or more anomalies detected in the multi-tenant cloud service; and cause data to be presented in the UI showing the correlation between the set of changelogs and the one or more anomalies in the multi-tenant cloud service.

11. The non-transitory computer storage medium of claim 9, having further computer executable instructions stored thereon to:

utilize the mapping data to identify one or more of the components in the multi-tenant cloud service that can be impacted by a change associated with one changelog included in the set of changelogs; and cause data to be presented in the UI showing the identified one or more of the components in the multi-tenant cloud service that can be impacted by the change.

12. The non-transitory computer storage medium of claim 9, having further computer executable instructions stored thereon to:

utilize the mapping data to identify a change associated with one changelog included in the set of changelogs that might have impacted one or more of the components in the multi-tenant cloud service; and cause data to be presented in the UI showing the identified change.

13. An apparatus, comprising:

one or more processors; and at least one non-transitory computer storage medium having computer executable instructions stored thereon which, when executed by the one or more processors, cause the apparatus to obtain changelogs from a plurality of services executing in a multi-tenant cloud service, the changelogs describing changes to software or hardware of components operating in the multi-tenant cloud service and the changelogs being expressed using a plurality of schemas, transform the changelogs expressed using the plurality of schemas to a plurality of changelogs expressed using a common schema, wherein each of the plurality of changelogs expressed using the common schema describes changes to a component in the multi-tenant cloud service, expose a network service application programming interface (API) for accessing the plurality of changelogs expressed using the common schema, receive, from a service executing in the multi-tenant cloud service, a call through the network service API for a set of changelogs included in the plurality of changelogs expressed using the common schema, the set of changelogs requested via the call describing changes to the components in the multi-tenant cloud service associated with a single tenant; and respond to the call by accessing mapping data describing relationships between the components and a plurality of tenants of the multi-tenant cloud service to determine a set of the components in the multi-tenant cloud service servicing the single tenant, searching, based on the mapping data, the plurality of changelogs expressed using the common schema to identify changelogs associated with the set of components in the multi-tenant cloud service determined using the mapping data to be servicing the single tenant, and returning the changelogs identified from the plurality of changelogs associated with the set of components in the multi-tenant cloud service servicing the single tenant in response to the call.

14. The apparatus of claim 13, wherein the computer storage medium has further computer executable instructions stored thereon to: receive a request for a user interface (UI) presenting the set of changelogs; make the call to the network service API to obtain the set of changelogs in response to the request; perform one or more processing operations on the set of changelogs; and cause the UI to be presented, the UI comprising the set of changelogs.

15. The apparatus of claim 14, wherein the computer storage medium has further computer executable instructions stored thereon to:

correlate the set of changelogs with one or more anomalies detected in the multi-tenant cloud service; and cause data to be presented in the UI showing the correlation between the set of changelogs and the one or more anomalies in the multi-tenant cloud service.

16. The apparatus of claim 14, wherein the computer storage medium has further computer executable instructions stored thereon to:

utilize the mapping data to identify one or more of the components in the multi-tenant cloud service that can be impacted by a change associated with one changelog included in the set of changelogs; and cause data to be presented in the UI showing the identified one or more of the components in the multi-tenant cloud service that can be impacted by the change.

17. The apparatus of claim 14, wherein the computer storage medium has further computer executable instructions stored thereon to:

utilize the mapping data to identify a change associated with one changelog included in the set of changelogs that might have impacted one or more of the components in the multi-tenant cloud service; and cause data to be presented in the UI showing the identified change.

* * * * *